United States Patent
Gromes, Sr. et al.

(10) Patent No.: US 11,733,720 B2
(45) Date of Patent: *Aug. 22, 2023

(54) INDEXER AND METHOD OF USE THEREOF

(71) Applicant: TERYDON, INC., Navarre, OH (US)

(72) Inventors: Terry D. Gromes, Sr., Navarre, OH (US); Terry D. Gromes, Jr., Navarre, OH (US); Kristen E. Griffin, Navarre, OH (US); Jon M. Shockey, Jr., Canton, OH (US); Gordon W. East, North Canton, OH (US); William C. Jackson, Cleveland, OH (US)

(73) Assignee: TERYDON, INC., Navarre, OH (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/685,552

(22) Filed: Mar. 3, 2022

(65) Prior Publication Data

US 2022/0187854 A1 Jun. 16, 2022

Related U.S. Application Data

(63) Continuation-in-part of application No. 16/943,032, filed on Jul. 30, 2020, now Pat. No. 11,300,981,
(Continued)

(51) Int. Cl.
 *G05D 7/06* (2006.01)
 *B24C 7/00* (2006.01)
 (Continued)

(52) U.S. Cl.
 CPC .......... *G05D 7/0617* (2013.01); *B24C 3/327* (2013.01); *B24C 7/0015* (2013.01); *F28G 1/163* (2013.01);
 (Continued)

(58) Field of Classification Search
 None
 See application file for complete search history.

(56) References Cited

U.S. PATENT DOCUMENTS 3,354,490 A 11/1967 Masters et al.
3,665,608 A 5/1972 Stockebrand
(Continued)

FOREIGN PATENT DOCUMENTS

CN 100500308 C 6/2009
CN 2018828811 U 5/2011
(Continued)

OTHER PUBLICATIONS

Operation Manual Sabertooth Air Powered Dual Hose Reel StoneAge. 2010.
(Continued)

*Primary Examiner* — Christopher W Fulton
(74) *Attorney, Agent, or Firm* — Sand, Sebolt & Wernow Co., LPA

(57) ABSTRACT

Water-jet cleaning system and a method of cleaning a heat exchanger. The equipment includes a rotary tool having a lance with at least two degrees of freedom. The lance's movements relative to openings defined in the heat exchanger face plate are controlled via a smart indexing controller. The controller includes an electronic communication device that is specifically programmed to selectively activate various components of the rotary tool and a water delivery system. The programming utilizes an observed, learned, or uploaded pattern of the heat exchanger tube openings to selectively rotate the lance relative to the rotary tool's mounting assembly or linearly move the lance towards or away from the mounting assembly. The control-
(Continued)

ler moves the lance to align a nozzle thereon with a selected opening in the face plate and then delivers a high pressure water jet therethrough.

20 Claims, 17 Drawing Sheets

Related U.S. Application Data which is a continuation-in-part of application No. 16/265,387, filed on Feb. 1, 2019, now Pat. No. 10,747,238, which is a continuation of application No. 16/155,340, filed on Oct. 9, 2018, now Pat. No. 10,599,162, which is a continuation of application No. 15/689,483, filed on Aug. 29, 2017, now Pat. No. 10,401,878, said application No. 16/155,340 is a continuation of application No. 15/689,572, filed on Aug. 29, 2017, now Pat. No. 10,408,552.

(60) Provisional application No. 62/381,390, filed on Aug. 30, 2016.

(51) Int. Cl.
| | |
|---|---|
| *G06F 3/04886* | (2022.01) |
| *B24C 3/32* | (2006.01) |
| *F28G 1/16* | (2006.01) |
| *F28G 15/00* | (2006.01) |
| *F28G 15/02* | (2006.01) |
| *F28G 15/08* | (2006.01) |
| *F28D 7/16* | (2006.01) |

(52) U.S. Cl.
CPC ............ *F28G 15/003* (2013.01); *F28G 15/02* (2013.01); *F28G 15/08* (2013.01); *G06F 3/04886* (2013.01); *F28D 7/16* (2013.01)

(56) References Cited

U.S. PATENT DOCUMENTS

| | | | |
|---|---|---|---|
| 3,794,051 A | 2/1974 | Lee et al. | |
| 3,821,498 A | 6/1974 | Shaefer, Jr. et al. | |
| 3,901,252 A | 8/1975 | Riebe | |
| 3,903,912 A | 9/1975 | Ice, Jr. et al. | |
| 4,001,556 A | 1/1977 | Folchi et al. | |
| 4,229,136 A | 10/1980 | Panissidi | |
| 4,367,790 A | 1/1983 | Draeger | |
| 4,379,335 A | 4/1983 | Kirsch et al. | |
| 4,380,796 A | 4/1983 | Ostby | |
| 4,437,201 A | 3/1984 | Zalewski | |
| 4,527,515 A | 7/1985 | Hester, II | |
| 4,716,611 A | 1/1988 | Barry | |
| 4,760,859 A | 8/1988 | Brown | |
| 4,773,357 A | 9/1988 | Scharton et al. | |
| 4,813,146 A | 3/1989 | Jaluzot | |
| 4,918,817 A | 4/1990 | Eaton | |
| 5,092,193 A | 3/1992 | Yanagisawa | |
| 5,148,600 A | 9/1992 | Chen et al. | |
| 5,276,970 A | 1/1994 | Wilcox et al. | |
| 5,570,660 A | 11/1996 | Vandenberg | |
| 5,838,882 A | 11/1998 | Gan et al. | |
| 5,954,494 A | 9/1999 | Goldsmith et al. | |
| 6,232,736 B1 | 5/2001 | Bullen | |
| 6,457,792 B1 | 10/2002 | Saund et al. | |
| 6,681,839 B1 | 1/2004 | Balzer | |
| 6,877,930 B2 | 4/2005 | Stromdahl et al. | |
| 7,228,125 B2 | 6/2007 | Adachi et al. | |
| 7,846,260 B2 | 12/2010 | Jiang et al. | |
| 8,057,607 B2 | 11/2011 | Gardner et al. | |
| 8,078,297 B2 | 12/2011 | Lasher et al. | |
| 8,195,344 B2 | 6/2012 | Song et al. | |
| 8,308,869 B2 | 11/2012 | Gardner et al. | |
| 8,524,011 B2 | 9/2013 | Gardner | |
| 8,612,641 B1 | 12/2013 | Bozarth et al. | |
| 8,646,416 B2 | 2/2014 | Hawkins et al. | |
| 8,676,390 B2 | 3/2014 | Berry et al. | |
| 8,978,276 B2 | 3/2015 | Moon, Jr. et al. | |
| 9,062,921 B2 | 6/2015 | Gromes, Sr. | |
| 9,328,979 B2 | 5/2016 | Brumfield | |
| 9,363,220 B2 | 6/2016 | Ubillos et al. | |
| 9,605,915 B2 | 3/2017 | Crock | |
| 9,851,164 B2 * | 12/2017 | Hand | B25J 19/022 |
| 9,939,215 B2 | 4/2018 | Gzym et al. | |
| 10,024,613 B2 | 7/2018 | Mathis | |
| 10,401,878 B2 | 9/2019 | Gromes, Sr. et al. | |
| 10,408,552 B2 | 9/2019 | Gromes, Sr. et al. | |
| 10,502,509 B2 | 12/2019 | Brumfield et al. | |
| 10,514,217 B2 | 12/2019 | Wall et al. | |
| 10,599,162 B2 | 3/2020 | Gromes, Sr. et al. | |
| 10,747,238 B2 | 8/2020 | Gromes, Sr. et al. | |
| 10,890,390 B2 | 1/2021 | Gromes, Sr. et al. | |
| 11,248,860 B2 * | 2/2022 | Schneider | F28G 15/04 |
| 11,294,399 B2 * | 4/2022 | Gromes, Sr. | F28G 1/163 |
| 11,300,981 B2 * | 4/2022 | Gromes, Sr. | B24C 7/0015 |
| 11,460,258 B2 * | 10/2022 | Brumfield | B08B 9/0325 |
| 2003/0065424 A1 | 4/2003 | Erichsen et al. | |
| 2003/0147727 A1 | 8/2003 | Fujishima et al. | |
| 2003/0202091 A1 | 10/2003 | Garcia et al. | |
| 2004/0035445 A1 | 2/2004 | Saxon et al. | |
| 2004/0069331 A1 | 4/2004 | Garman et al. | |
| 2004/0093850 A1 | 5/2004 | Horii et al. | |
| 2004/0182842 A1 | 9/2004 | Denney et al. | |
| 2005/0196314 A1 | 9/2005 | Petersen et al. | |
| 2006/0090622 A1 | 5/2006 | Adkins | |
| 2006/0196576 A1 | 9/2006 | Fleming | |
| 2006/0212203 A1 | 9/2006 | Furuno | |
| 2006/0249185 A1 | 11/2006 | Garman | |
| 2008/0062140 A1 | 3/2008 | Hotelling et al. | |
| 2008/0062141 A1 | 3/2008 | Hotelling et al. | |
| 2008/0175569 A1 | 7/2008 | Johnson | |
| 2008/0185126 A1 | 8/2008 | Jiang et al. | |
| 2008/0204426 A1 | 8/2008 | Hotelling et al. | |
| 2008/0282583 A1 | 11/2008 | Koellner et al. | |
| 2009/0097502 A1 | 4/2009 | Yamamoto | |
| 2010/0062697 A1 | 3/2010 | Vedsted | |
| 2010/0095559 A1 | 4/2010 | Buckner | |
| 2010/0185364 A1 | 7/2010 | McClure | |
| 2010/0186971 A1 | 7/2010 | Seyffert | |
| 2010/0313451 A1 | 12/2010 | Trubiano | |
| 2011/0186657 A1 | 8/2011 | Haviland | |
| 2011/0287692 A1 | 11/2011 | Erichsen et al. | |
| 2011/0301755 A1 | 12/2011 | Anderson | |
| 2011/0315164 A1 | 12/2011 | DesOrmeaux | |
| 2012/0007885 A1 | 1/2012 | Huston | |
| 2012/0024321 A1 | 2/2012 | Hays | |
| 2012/0061108 A1 | 3/2012 | Cerrano | |
| 2012/0067370 A1 | 3/2012 | Crock et al. | |
| 2012/0229662 A1 | 9/2012 | Lankalapalli et al. | |
| 2012/0330449 A1 | 12/2012 | Edwards et al. | |
| 2013/0030589 A1 | 1/2013 | Pessina et al. | |
| 2013/0033090 A1 | 2/2013 | Jokonya | |
| 2013/0042894 A1 | 2/2013 | Gromes, Sr. | |
| 2013/0167697 A1 | 7/2013 | Reukers | |
| 2013/0245835 A1 | 9/2013 | Watanabe | |
| 2013/0271004 A1 | 10/2013 | Min et al. | |
| 2014/0014141 A1 | 1/2014 | Watson | |
| 2014/0045409 A1 | 2/2014 | Zhang et al. | |
| 2014/0046477 A1 | 2/2014 | Brahan et al. | |
| 2015/0034128 A1 | 2/2015 | Brumfield | |
| 2015/0065114 A1 | 3/2015 | Dua | |
| 2015/0065653 A1 | 5/2015 | Gzym et al. | |
| 2015/0204768 A1 | 7/2015 | Newman | |
| 2015/0258694 A1 | 9/2015 | Hand et al. | |
| 2015/0379785 A1 | 12/2015 | Brown, Jr. et al. | |
| 2016/0025433 A1 | 1/2016 | Mathis | |
| 2016/0243597 A1 | 8/2016 | Shawver | |
| 2017/0102195 A1 | 4/2017 | Watkins | |
| 2017/0108300 A1 | 4/2017 | Brumfield | |
| 2017/0348931 A1 | 12/2017 | Yuzer et al. | |
| 2018/0281030 A1 | 10/2018 | Eisermann et al. | |
| 2018/0292151 A1 | 10/2018 | Mathis | |
| 2019/0041877 A1 | 2/2019 | Gromes, Sr. et al. | |

(56) References Cited

U.S. PATENT DOCUMENTS

| | | | |
|---|---|---|---|
| 2019/0163207 A1 | 5/2019 | Gromes, Sr. et al. |
| 2019/0346866 A1 | 11/2019 | Gromes, Sr. et al. |
| 2019/0353437 A1 | 11/2019 | Gromes, Sr. et al. |
| 2020/0166957 A1 | 5/2020 | Gromes, Sr. et al. |
| 2020/0166958 A1 | 5/2020 | Gromes, Sr. et al. |
| 2020/0356117 A1 | 11/2020 | Gromes, Sr. et al. |
| 2020/0356118 A1 | 11/2020 | Gromes, Sr. et al. |
| 2021/0026379 A1 | 1/2021 | Gromes, Sr. et al. |
| 2021/0207903 A1 | 7/2021 | Gromes, Sr. et al. |

FOREIGN PATENT DOCUMENTS

| | | |
|---|---|---|
| CN | 203250208 U | 10/2013 |
| CN | 203837569 U | 9/2014 |
| CN | 104181867 A | 12/2014 |
| CN | 10440896 A | 3/2015 |
| DE | 3426889 | 5/1985 |
| DE | 102014104356 | 10/2015 |
| EP | 0569080 | 11/1993 |
| EP | 0803697 | 10/1997 |
| FR | 2563331 | 10/1985 |
| WO | 0111303 | 2/2001 |
| WO | 2009131512 | 10/2009 |
| WO | 2016037197 | 3/2016 |
| WO | 2020086873 | 4/2020 |

OTHER PUBLICATIONS

Spong, et al. Robot Dynamics and Control. 2nd Edition p. 9,1.1, pp. 13-22, 1.3.1-1.3.6; Jan. 28, 2004.
Shawver. How Automated Water Jetting Improves Tube Bundle Cleaning Efficiency. 2011 WJTA-IMCA Conference and Expo. Sep. 2011. Houston, TX.
Topcon introduces X-22 wireless excavator control system, www.equipmentworld.com/topcon-introduces-x-22-wireless-excavator-control-system/, Annotated, Equipment World Staff, Oct. 28, 2011, 4 pages.
Video Stutes Enterprise Live Demo—2013 WJTA-IMCA Conference & Expo (https://www.youtube.com/watch?v=zoCFoopM yU).
Video Peinemann Equipment Live Demo—2013 WJTA-IMCA Conference & Expo Sep. 11, 2013 (https://www.youtube.com/watch?v=GPa2w65ZNkE).
Video Veolia Diamondback(https://www.youtube.com/watch?v=8tAZwctqneQ); Feb. 13, 2014.
WardJet Brochure, X-Classic Controller, 2012, 3 pages.
Operation Manual Sabertooth Air Powered Dual Hose Reel StoneAge, StoneAge Waterblast Tools, (Sep. 1, 2010), pp. 1-7, XP055762268.

* cited by examiner

INDEXER AND METHOD OF USE THEREOF

CROSS-REFERENCE TO RELATED APPLICATIONS

This is a Continuation of U.S. patent application Ser. No. 16/943,032, filed Jul. 30, 2020, now U.S. Pat. No. 11,300,981, which is a Continuation-in-Part of U.S. patent application Ser. No. 16/265,387 filed Feb. 1, 2019, now U.S. Pat. No. 10,747,238, which is a Continuation of U.S. patent application Ser. No. 16/155,340, filed Oct. 9, 2018, now U.S. Pat. No. 10,599,162; which is a Continuation of U.S. patent application Ser. No. 15/689,483 filed Aug. 29, 2017, now U.S. Pat. No. 10,401,878; which claims the benefit of U.S. Provisional Patent Application Ser. No. 62/381,390, filed Aug. 30, 2016.

U.S. patent application Ser. No. 16/155,340 filed Oct. 9, 2018, now U.S. Pat. No. 10,599,162, is a Continuation of U.S. patent application Ser. No. 15/689,572, filed Aug. 29, 2017, now U.S. Pat. No. 10,408,552, which claims the benefit of U.S. Provisional Patent Application Ser. No. 62/381,390, filed Aug. 30, 2016.

The entire disclosures of the above-listed applications are all incorporated herein by reference.

TECHNICAL FIELD

The present disclosure is directed generally to equipment and a method of cleaning heat exchanger tubes. More particularly, the disclosure relates to water-jet cleaning system and a method of setting up and operating the same using a smart indexing controller. Specifically, the disclosure is directed to a rotary tool having a lance with at least two degrees of freedom. The lance's movements relative to openings defined in the heat exchanger face plate are controlled via the smart indexing controller. Specifically, an electronic communication device is specially programmed to selectively activate various components of the rotary tool and a water delivery system.

BACKGROUND INFORMATION

Heat exchangers typically include a tube bundle, i.e., a plurality of individual tubes, encased in a cylindrical outer shell. An end of each tube terminates in a face plate that is secured to one end of the cylindrical shell via a flange. The face plate defines a plurality of openings therein and each of these openings permits access to the bore of one of the tubes in the tube bundle.

After a heat exchanger has been used for some time, the bores of the heat exchanger tubes tend to become partially or completely blocked with material deposited therein by steam travelling through the heat exchanger tubes. It becomes necessary to clean out this accumulated material from the tube bores from time to time so that the heat exchanger continues to operate efficiently. The typical way of cleaning these tube bores is by directing a high pressure water-jet into the bore and blasting away the built-up materials.

One of the issues when cleaning heat exchanger tubes with a high pressure water-jet is that the high-pressure stream of water has to be directed reasonably accurately into the opening of each tube. If the water-jet is not in the correct location relative to the perimeter of the opening, not only will the tube fail to be scoured clean of built-up material but the water-jet may be deflected through contacting part of the face plate surrounding the tube opening. The deflected water-jet may seriously injure the operator of the cleaning system or cause damage to other objects in the vicinity of the heat exchanger simply because of the pressure under which the water is delivered through the nozzles on the cleaning system.

The tubes in a heat exchanger tube bundle are typically arranged in such a manner that the openings in the face plate tend to form a pattern. The openings are spaced horizontally and vertically from each other and may be offset at an angle relative to each other and to an X-axis and Y-axis. The pattern and spacing of these openings tends to vary from one heat exchanger to another. Additionally, the diameters of the openings in the face plates (and the diameters of the tubes in the shell) may vary from one heat exchanger to the next. It is therefore problematic to set up water-jet cleaning system in such a way as to accurately aim the water jets into the tube openings. In the past, a substantial amount of time-consuming manual adjustment had to be undertaken to set up the cleaning system to make sure that the tubes would all be adequately cleaned. It has also been even more problematic in the past to move cleaning system from one heat exchanger to another without expending quite a long time in setting-up the cleaning system on the new heat exchanger.

In the past, many proposed cleaning systems have included elaborate structures that are utilized to retain the cleaning system on the heat exchanger face plate or flange or to move the lances and nozzles from one tube opening to another during a cleaning operation. These elaborate structures are expensive to manufacture, time consuming to set up, and time consuming to take down.

In addition to these aforementioned problems, a human operator has had to set up and control the cleaning system and this can be a time consuming and inaccurate endeavor.

One solution to these problems has been disclosed in U.S. patent application Ser. No. 16/265,387 (Gromes et al.) entitled "Indexer, Indexer Retrofit Kit and Method of Use Thereof", the entire disclosure of which is incorporated herein by reference. Gromes et al discloses an indexer having two supporting arms that are oriented at right angles to each other and are engaged with a heat exchanger face plate. The system utilizes a communication device specially programmed to learn the pattern of the heat exchanger tube openings and to control the linear movements of a supporting arm and a lance-carrying carriage assembly to navigate from one tube opening to another.

SUMMARY

The presently disclosed cleaning system utilizes a smart indexing controller to control rotational motion of a supporting arm upon which a lance-carrying carriage assembly is engaged. The smart indexing controller also controls linear motion of the supporting arm and linear motion of the carriage assembly. The disclosed cleaning system is able to be quickly and easily set up to accommodate differently-patterned tube openings in different heat exchangers. The cleaning system is capable of adequately cleaning substantially all of the tubes in each heat exchanger with which it is engaged. The rotary tool of the cleaning system, the smart indexing controller, and a method disclosed herein are designed to address at least some of the issues with prior art devices.

A water-jet cleaning system and a method of cleaning a heat exchanger therewith are disclosed herein. The equipment includes a rotary tool having a lance with at least two degrees of freedom. The lance's movements relative to openings defined in the heat exchanger face plate are controlled via a smart indexing controller. The smart indexing controller comprises an electronic communication device which is specifically programmed to selectively activate various components of the rotary tool and a water delivery system. The programming utilizes an observed, learned, or uploaded pattern of the heat exchanger tube openings. A human operator uses the communication device to selectively rotate the lance relative to the rotary tool's mounting assembly or linearly move the lance towards or away from the mounting assembly. The smart indexing controller moves the lance to align a nozzle thereon with a selected opening in the face plate and then delivers a high pressure water jet therethrough.

The rotary tool disclosed herein is easy to set up and take down, and the smart indexing controller used therewith is capable of rapidly learning the pattern of tube openings on a heat exchanger face plate. The smart indexing controller is able to control the rotary tool and thereby at least one lance engaged therewith and is able to move the lance precisely from one opening on a tube bundle to another. The system enables a human operator to be located at a safe operating distance from the face plate of the heat exchanger and therefor at a safer distance from the high pressure water-jet utilized for cleaning. The smart indexing controller comprises an electronic device such as a tablet or smart phone that is provided with special programming that is used to control the operation of the rotary tool and the movement of the at least one lance The human operator may perform a setup procedure where a number of quick and simple setup maneuvers are undertaken with the rotary tool so that the programming will learn the pattern of the openings on the heat exchanger face plate. Alternatively, the pattern may be uploaded to the electronic device. The learned or uploaded pattern from each heat exchanger with which the rotary tool has been engaged with be stored in the memory of the electronic device. As a consequence, that information is available for the operator to access the next time the same heat exchanger is cleaned. This reduces the time to setup the rotary tool and begin a cleaning operation. In particular, the programming in the electronic device stores the relative distance measurements between two adjacent row and column tube openings on the face plate. The programming maps out or determines the pattern of the openings in the face plate and during a subsequent cleaning operation, the derived relative distance measurements may be used to react to operator positioning requests. In other words, the stored information aids the operator in progressively moving the cleaning system's nozzles from one opening in the heat exchanger face plate to another until all tubes in the heat exchanger have been cleaned. This may all be accomplished without putting the operator at unnecessary risk. It is contemplated that the learned pattern may also be utilized by the smart indexing controller to automatically move from one tube opening to another during a cleaning operation.

The apparatus disclosed herein includes a mounting assembly that is positionable proximate the face plate or flange on a heat exchanger. A support arm is operatively engaged with the mounting assembly in such a way as to be able to rotate relative to the mounting assembly. Furthermore, the supporting arm is operatively engaged with the mounting assembly in such a way as to move linearly relative to the mounting assembly. A carriage assembly is operatively engaged with the supporting arm and the carriage assembly supports one or more cleaning lances thereon. The smart indexing controller's programming is operable to manipulate the position of the cleaning lances. In particular, the lances have at least two degrees of freedom. The lances are able to be rotated about an axis that extends through the mounting assembly and is oriented at right angles to the face plate. The smart indexing controller initiates this rotation by activating a rotation motor on the mounting assembly and causing the rotation motor to rotate the entire supporting arm with which the lances are operatively engaged. The lances are also able to be moved linearly towards or away from the mounting assembly. The smart indexing controller initiates this linear motion in one of two ways. In a first way, the smart indexing controller activates a linear motor and/or translation mechanism that moves the entire supporting arm relative to the mounting assembly. In a second way, the smart indexing controller activates a linear motor and/or translation mechanism that moves the carriage assembly upon which the lances are mounted, linearly along the supporting arm. The human operator manipulates and controls the rotary tool and thereby the lances via the smart indexing controller. The ability of the supporting arm to rotate relative to the mounting assembly and be moved linearly relative thereto, in conjunction with the ability of the carriage assembly to be moved linearly along the supporting arm, enables the lances of the cleaning system to be aligned with substantially all of the heat exchanger tube openings during a cleaning operation.

In one aspect, an exemplary embodiment of the present disclosure may provide a system for cleaning a heat exchanger utilizing a high-pressure water jet, said system comprising a mounting assembly positionable proximate the heat exchanger; a lance operatively engaged with the mounting assembly and adapted to be connected to a remote water source; wherein the lance has at least a first degree of freedom and a second degree of freedom relative to the mounting assembly; and a communication device including programming operable to control movement of the lance relative to the mounting assembly In another aspect, an exemplary embodiment of the present disclosure may provide a method of cleaning a heat exchanger utilizing a high-pressure water jet; said method comprising providing a communication device provided with programming to control a cleaning operation of a heat exchanger using a fluid jet cleaning device; engaging the cleaning device on the heat exchanger using a mounting assembly; connecting a lance on the cleaning device to a remote water source; controlling movement of the lance relative to openings defined in a face plate of the heat exchanger using the programming in the communication device; moving the lance through one or more of a first degree of freedom and a second degree of freedom when moving from one opening in the face plate to another opening in the face plate.

In another aspect, an exemplary embodiment of the present disclosure may provide a system comprising a fluid jet machine adapted to be positioned proximate a heat exchanger to be cleaned, said fluid jet machine including a rotatable arm provided with a lance holder, wherein, during performance of a cleaning operation, the fluid jet machine operatively connects to a pump which pumps fluid under high pressure through a lance retained by the lance holder and into openings defined in a face plate of the heat exchanger; a computing device; and programming installed in the computing device and operable to control the fluid jet machine, rotation of the rotatable arm, and the cleaning operation; wherein the programming is configured to learn a pattern of the openings defined in the face plate and utilizes the learned pattern to move the lance progressively from one opening to another during the performance of the cleaning operation.

In another aspect, an exemplary embodiment of the present disclosure may provide a method of cleaning a plurality of tubes of a heat exchanger comprising engaging a fluid jet machine on the heat exchanger; operatively linking the fluid jet machine to a communication device; installing programming in the communication device that controls the fluid jet machine and a cleaning operation using the fluid jet machine; providing a pattern of openings in an face plate of the heat exchanger to the communication device; and performing the cleaning operation following the pattern.

In one embodiment, the pattern of openings is provided to the communication device by learning, by initiating the programming of the communication device, a pattern of the plurality of tubes of the heat exchanger. In one embodiment, the learning of the pattern of the plurality of tubes includes determining a pattern of openings to the plurality of tubes in the face plate of the heat exchanger. In one embodiment, the determining of the pattern of openings is accomplished using a camera to locate the openings in the face plate. In one embodiment the determining of the pattern of openings is accomplished using a laser to locate the openings in the face plate. In one embodiment, the determining of the pattern of openings is accomplished during a manual operation by the operator manually aligning the nozzle (or lance) on the fluid jet machine with a sample number of openings in the face plate. In one embodiment, the manually aligning of the nozzle includes controlling movement of the nozzle with the communication device. In one embodiment, the controlling of the movement of the nozzle with the communication device is accomplished by manipulating icons on a user interface of the communication device. In one embodiment, the determining of the pattern of openings is accomplished by uploading the pattern to the communication device. In one embodiment, the method further includes storing the learned or uploaded pattern of openings in a memory of the communication device.

In one embodiment, the programming in the communication device controls a position of a lance/lance holder/nozzle on the rotary tool by controlling rotation of a supporting arm of the rotary tool relative to a mounting assembly of the rotary tool. In one embodiment, the programming in the communications device controls a position of a lance/lance holder/nozzle on the rotary tool by controlling linear motion of a supporting arm of the rotary tool relative to a mounting assembly of the rotary tool. In one embodiment, the programming in the communications device controls a position of a lance/lance holder/nozzle on the rotary tool by controlling linear motion of a carriage assembly along a longitudinal axis of a supporting arm of the rotary tool. In one embodiment, the programming in the communications device controls a position of a lance/nozzle on the rotary tool by controlling rotational motion of a lance holder relative to a carriage assembly mounted on a supporting arm of the rotary tool.

In one embodiment, an exemplary embodiment of the present disclosure may provide a system comprising a fluid jet machine positionable proximate a heat exchanger to be cleaned, said fluid jet machine including a rotatable arm provided with a lance holder, wherein, during performance of a cleaning operation, the fluid jet machine operatively connects to a pump which pumps fluid under high pressure through a lance retained by the lance holder and into openings defined in a face plate of the heat exchanger; a computing device; programming installed in the computing device and operable to control the fluid jet machine, rotation of the rotatable arm, and the cleaning operation; wherein the programming is configured to follow a pattern of the openings defined in the face plate and utilizes the pattern to move the lance progressively from one opening to another during the performance of the cleaning operation.

In another embodiment, an exemplary embodiment of the present disclosure may provide a method of cleaning a heat exchanger utilizing a high-pressure water jet; said method comprising providing a communication device provided with programming to control a cleaning operation of a heat exchanger using a fluid jet cleaning device; positioning the fluid jet cleaning device proximate a face plate of the heat exchanger; providing a pattern of openings defined in the face plate of the heat exchanger, where each opening provides access to a bore of a heat exchanger tube; connecting a lance on the fluid jet cleaning device to a remote fluid source; controlling movement of the lance relative to the openings defined in the face plate of the heat exchanger using the programming in the communication device; following the pattern of openings in the face plate with the lance; and sequentially delivering a cleaning fluid under pressure through the lance and into each opening.

In one embodiment, the providing of the pattern of openings may include learning, with the programming provided in the communication device the pattern of openings. In one embodiment, the providing of the pattern of openings may further include storing the pattern of openings in a database of the communication device. In one embodiment, the method may further include mounting the lance on a rotatable arm; and rotating, with the programming of the communication device, the rotatable arm to follow the pattern of openings in the face plate.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1A:
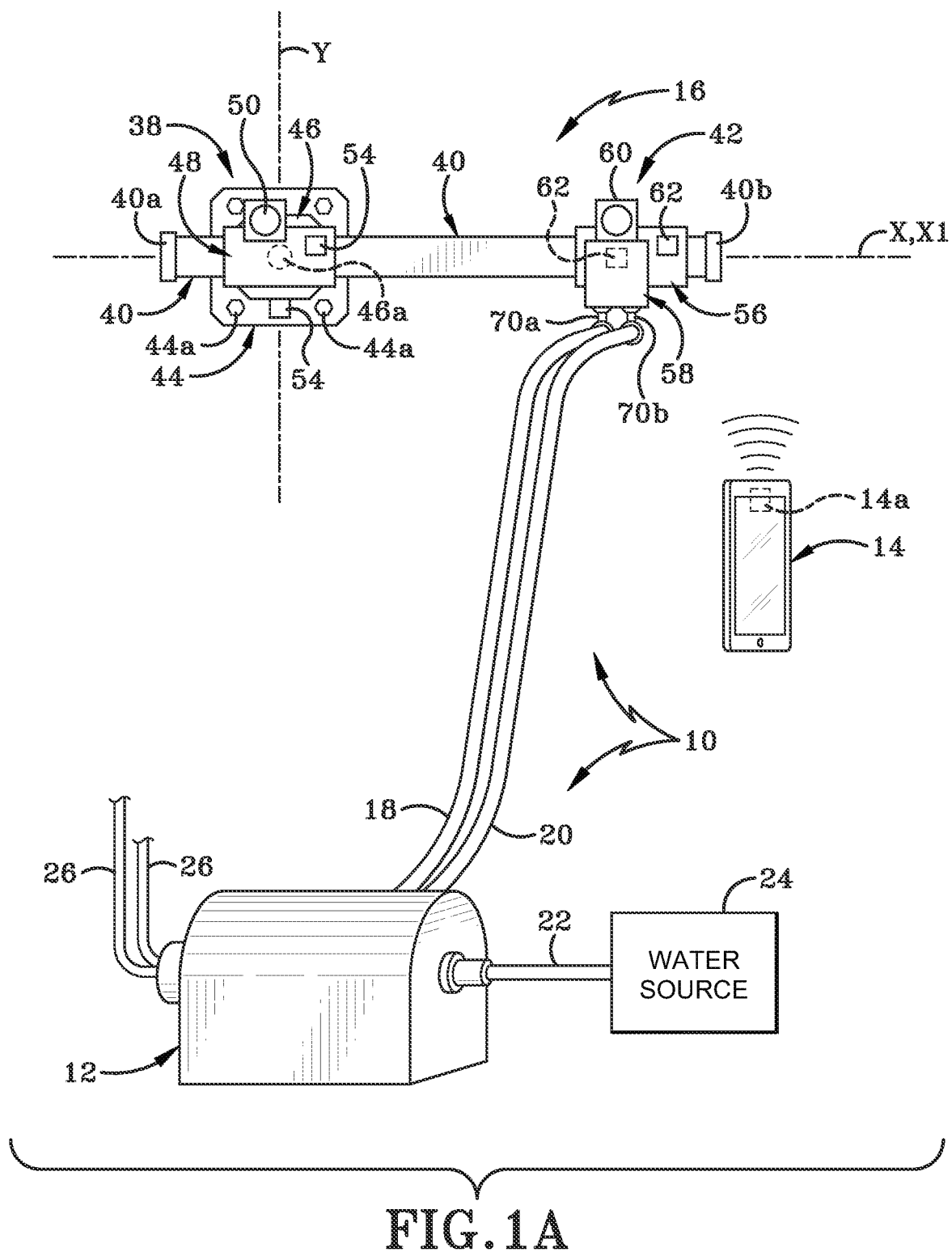
FIG. 1A is a diagrammatic front elevation view of a first embodiment of a cleaning system in accordance with the present disclosure, wherein the cleaning system includes a water delivery system, a communication device, and a rotary tool.

Referring to FIGS. 1A-4B, there is shown a first embodiment of a water-jet cleaning system in accordance with an aspect of the present disclosure, generally indicated at 10. Cleaning system 10 includes a water delivery system 12 for providing water for a cleaning operation, an electronic communication device 14, and a rotary tool 16 in accordance with the aspect of the present disclosure. As will be described later herein, an operator "P" is able to use communication device 14 to control the various components of the water delivery system 12 and of the rotary tool 16.

Water delivery system 12 is exemplified in the attached figures as a hose reel assembly that is connected by a first hose 18 and a second hose 20 to rotary tool 16 and by a third hose 22 to a remote water source 24. Hydraulic lines 26 operatively engage the hose reel assembly to a remote hydraulic source (not shown). Water delivery system 12 is utilized to deliver water or any other suitable cleaning fluid to rotary tool 16 under high pressure. Although not illustrated herein, the hose reel assembly of the water delivery system 12 may include a hose reel, one or more motors, one or more pumps, and one or more valves. The hose reel, motors, pumps, and valves in the hose reel assembly may be actively controlled by the operator "P" using communication device 14. The valves may include shut-off valves that are actively controlled by the operator "P" using communication device 14. In some embodiments, the shut-off valves may be activated if the operator "P" breaks physical contact with communication device 14.

Suitable water delivery systems 12 that are able to be utilized in cleaning system 10 include the hose reel assemblies disclosed in U.S. Pat. No. 9,062,921 (Gromes) and U.S. patent application Ser. No. 14/713,664, filed May 15, 2015 (Gromes), now abandoned, the disclosures of each being incorporated herein by reference. It should be understood, however, that any other suitable water delivery system 12 may be utilized in cleaning system 10.

It should be understood that although the substance being delivered by water delivery system 12 is described herein as "water", the term "water" should be understood to also encompass any fluid or any liquid other than actual water that is able to be delivered at high pressure to rotary tool 16 to perform a cleaning operation. The term "water" should therefore be understood to also include liquids and fluids that include particulate solids therein, if that is desired. For example, a gas including abrasive particles may be provided by the water delivery system 12 to rotary tool 16 to perform a cleaning operation.

Although not illustrated herein, cleaning system 10 may include a hub similar to that described in the Applicant's co-pending U.S. patent application Ser. No. 16/524,279, filed Jul. 29, 2019, now U.S. Pat. No. 10,890,390 entitled "Indexer, Indexer Retrofit Kit and Method of Use Thereof". The hub may include a plurality of receptacles that are utilized to connect sensor cables, air sources, lubricants etc. to rotary tool 16.

Communication device 14 may be any one of a variety of programmable electronic computing devices. These devices include, but are not limited to, a smart-phone, a tablet, a lap-top computer, and a control table. Communication device 14 is provided with special software/programing that enables communication device 14 to be used to control and operate water delivery system 12, rotary tool 16, and a hub, if provided. Communication device 14 may control water delivery system 12 and rotary tool 16 wirelessly. Wireless communication will enable the operator "P" to be positioned a distance away from rotary tool 16 and therefore a distance away from the water-jet cleaning operation performed thereby. Wireless operation from a remote distance increases safety for the operator as the high pressure water-jets delivered by rotary tool 16 are less likely to contact the operator "P" if deflected. In other instances, communication device 14 may be directly wired to rotary tool 16. Communication device 14 may be operated in the vicinity of the heat exchanger and rotary tool 16 or may be located at a remote location a distance from the heat exchanger and rotary tool.

A particularly suitable communication device 14 and a software for this purpose may be a handheld tablet or smartphone that is provided with programming marketed under the tradename "THE LUNCH BOX™" (Terydon, Inc. of Navarre, Ohio, US). A wireless communication device and a method for controlling water cleaning system utilizing the communication device and THE LUNCH BOX™ programming is disclosed in several patent applications all commonly owned by Terydon, Inc. These patent applications include U.S. patent application Ser. No. 14/204,265 filed Mar. 11, 2014 entitled "Adaptive Controller", now U.S. Pat. No. 10,265,834; U.S. patent application Ser. No. 14/204,350 filed Mar. 11, 2014, entitled "System and Method for Wireless Control using a Deadman Switch", now U.S. Pat. No. 10,040,169; U.S. patent application Ser. No. 14/204,451, filed Mar. 11, 2014, entitled "Mechanism for Remotely Controlling Water-jet Equipment", now abandoned; U.S. patent application Ser. No. 14/204,554 filed Mar. 11, 2014 entitled "Method and Apparatus for using an Application to Control with a Deadman's Switch, now abandoned; and U.S. patent application Ser. No. 14/997,035 filed Jan. 15, 2016 entitled "Mechanism for Remotely Controlling Equipment", now abandoned. The entire disclosures of all of these applications and patents are incorporated herein by reference.

Communication device 14 may be Bluetooth® enabled and may be paired to multiple devices via a master/slave relationship. For example, the communication device 14 may be connected via THE LUNCH BOX™ to pump(s) and valves in water delivery system 12 and/or to various components on rotary tool 16, as will be described later herein. A user interface on communication device 14, such as a touchscreen, may include a "Connect button" that allows communication device 14 to scan for other devices or components of cleaning system 10 with which to pair. A listing or menu of Bluetooth® enabled devices may appear on the user interface and the operator may then select which devices or components to link with communication device 14. Appropriate security codes may be required to enable the pairing and, once connected, the Bluetooth® connectivity may not be severed from an outside source. If Bluetooth® connection is lost then all operations of the water delivery system 12 and rotary tool 16 will cease automatically and substantially immediately, i.e., with only the delay required to break communication and shut-off operations (around a few seconds).

Figure 1B:
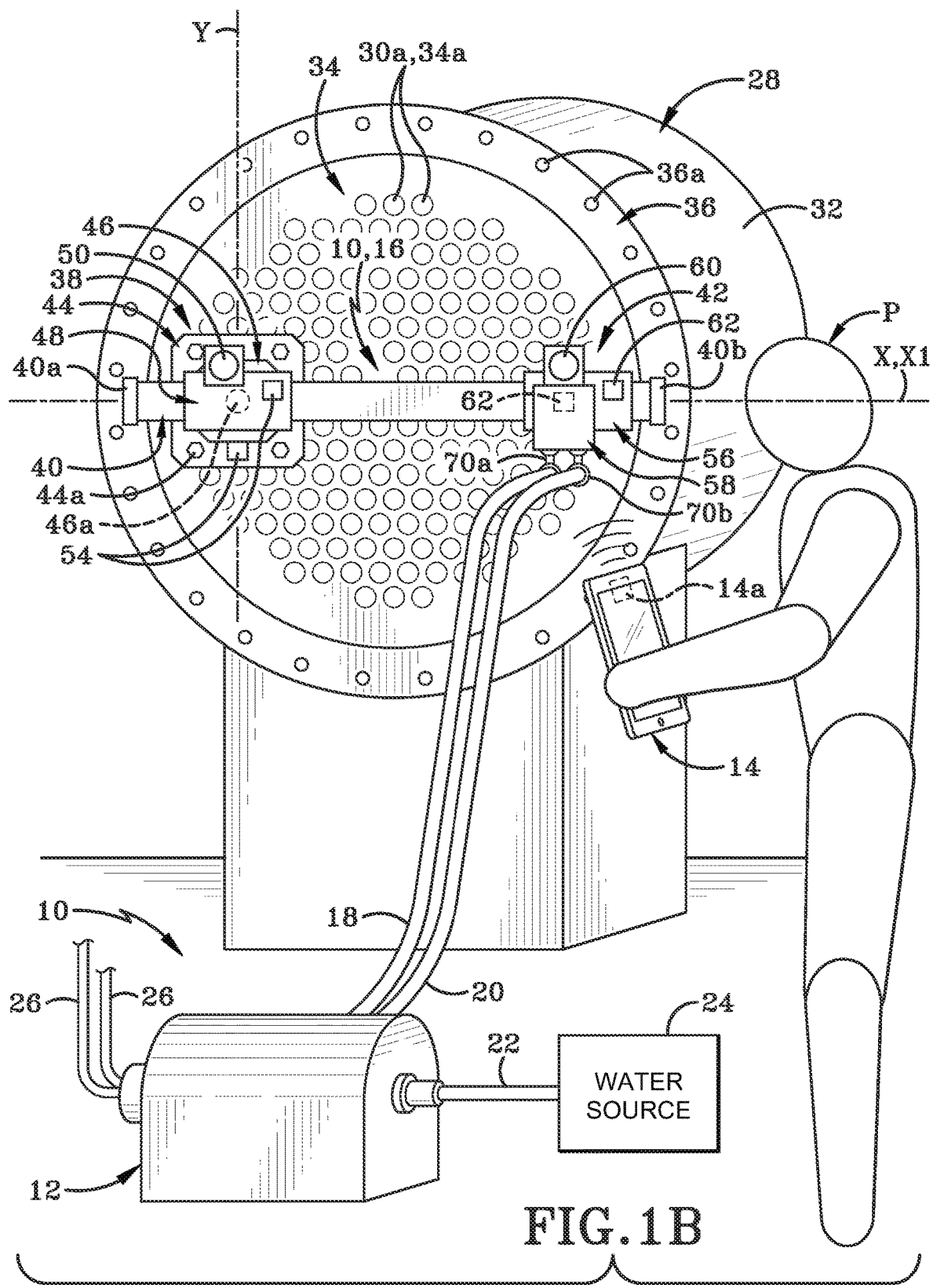
FIG. 1B is a diagrammatic front elevation of the cleaning system of FIG. 1A shown engaged with a heat exchanger and being controlled by an operator via the communication device.
Figure 2:
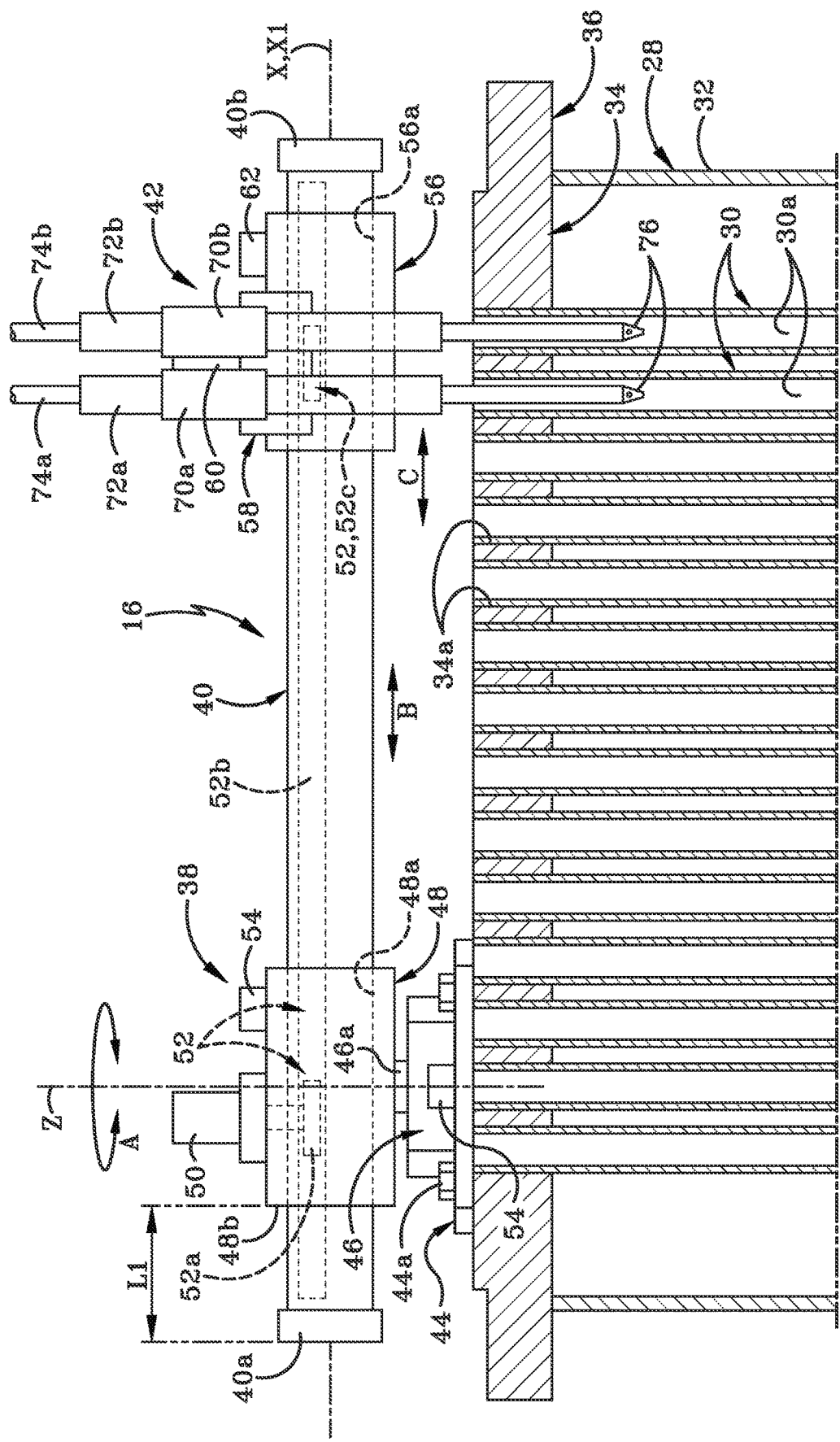
FIG. 2 is a diagrammatic cross-section of the first embodiment of the cleaning system engaged with the heat exchanger and viewed in the direction of line 2-2 of FIG. 1B.
Figure 3:
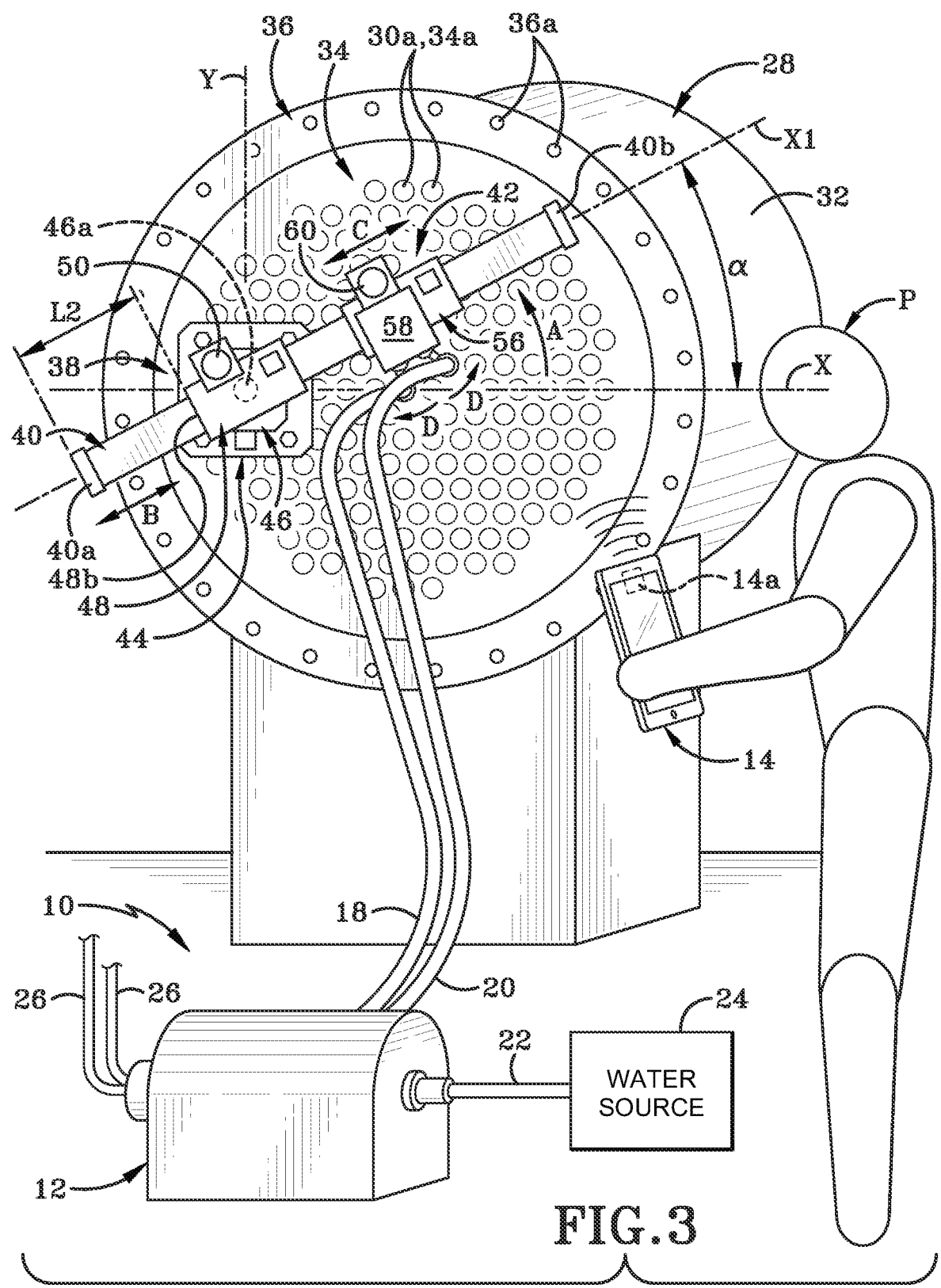
FIG. 3 is a diagrammatic front elevation view of the first embodiment of the cleaning system performing a cleaning operation.

FIGS. 1B, 2, and 3 illustrate an exemplary heat exchanger 28 that may be cleaned using cleaning system 10. Heat exchanger 28 comprises a plurality of tubes 30 (FIG. 2) arranged in a tube bundle and encased in a hollow cylindrical shell 32. The tubes 30 in the tube bundle are arranged side-by-side and one above another. Each tube 30 of the tube bundle terminates in heat exchanger face plate 34 that is provided at one end of shell 32. A plurality of openings 34a is defined in face plate 34 and each opening 34a provides access to a bore 30a of one of the tubes 30 in the tube bundle. Because the tubes 30 in the tube bundle are arranged in a particular manner relative to each other, the openings 34a in face plate 34 tend to be arranged in a pattern. The pattern corresponds to an arrangement of the tube openings 34a defined in face plate 34. An exemplary pattern of openings 34a is shown in FIG. 1B. It will be understood that other different patterns of openings 34a may be presented on face plate 34 since these patterns are the result of the specific arrangement and configuration of the tubes 30 in the tube bundle of a specific heat exchanger. Typically, face plate 34 will tend to show a honeycomb pattern of openings 34a or a straight line pattern of openings 34a but the spacing and angle between the various openings 34a tends to differ from one heat exchanger to another. Face plate 34 may be secured to one end of shell 32 by a flange 36. Flange 36 may define a plurality of apertures 36a therein. Apertures 36a are located at intervals around a circumference of flange 36.

FIGS. 1A to 4B show a first embodiment of the rotary tool 16 in accordance with the present disclosure. Rotary tool 16 comprises a mounting assembly 38, a supporting arm 40, and a carriage assembly 42.

Mounting assembly 38 includes a mounting plate 44 that is secured to face plate 34 of heat exchanger 28 by a plurality of fasteners 44a. Each fastener 44a is received through one of the openings 34a defined by face plate 34. Fasteners 44a may be any suitable component that is useful for securely mounting plate 44 to face plate 34. For example, each fastener 44a may be an expansion bolt. Mounting plate 44 is illustrated in FIG. 1B as being offset from a center point of the face plate 34. One edge of mounting plate 44 is located proximate flange 36 of heat exchanger 28.

Mounting assembly 38 further includes a rotation motor 46 provided on an upper surface of mounting plate 44. Rotation motor 46 includes a drive shaft 46a which extends outwardly and upwardly from rotation motor 46 and is oriented at right angles to the upper surface of mounting plate 44. For the purposes of the following discussion, face plate 34 is shown as having a horizontal axis "X" and a vertical axis "Y" that are oriented at right angles to each other and intersect at a center line of drive shaft 46a.

Mounting assembly 38 further includes a trolley housing 48 operatively engaged with the drive shaft 46a of rotation motor 46. When rotation motor 46 is actuated, trolley housing 48 is selectively rotated by drive shaft 46a about an axis "Z" (FIG. 2) extending along drive shaft 46a. The axis "Z" is oriented at right angles to the horizontal axis "X" and vertical axis "Y". The axis "Z" is additionally oriented at right angles to the upper surface of mounting plate 44. Rotation motor 46 may be actuated to selectively rotate trolley housing 48 in one of a clockwise direction and a counter-clockwise direction about axis "Z". The possible directions of rotation of trolley housing 48 are indicated by the arrow "A" in FIGS. 2 and 3.

As shown in FIG. 2, supporting arm 40 extends through an interior bore 48a defined by trolley housing 48. Bore 48a is oriented generally parallel to a longitudinal axis "X1" of supporting arm and at right angles to axis "Z". Mounting assembly 38 further includes a first linear motor 50. A translation mechanism 52 operatively engages supporting arm 40 and trolley housing 48 to each other. Translation mechanism 52 is operatively linked to first linear motor 50. The translation mechanism 52 may be any suitable mechanism that retains the supporting arm 40 and trolley housing 48 in engagement with each other and also selectively enables the supporting arm 40 to move linearly relative to trolley housing 48. One suitable type of translation mechanism is a rack and pinion system. This type of translation mechanism is illustrated in FIG. 2. The translation mechanism includes a toothed gear (or pinion) 52a that is operatively engaged with first linear motor 50 and a rack 52b that is provided on supporting arm 40. Linear motor 50 is actuated to cause the gear 52a to rotate in one of a first direction or a second direction depending on the direction in which supporting arm 40 is to be moved. Gear 52a is interlockingly engaged with the pinion 52b. When gear 52a rotates in a first rotational direction it will cause supporting arm 40 to be moved in a first linear direction relative to mounting assembly 38. When gear 52a rotates in a second rotational direction, it will cause supporting arm 40 to be moved in a second linear direction relative to mounting assembly 38, where the second linear direction is opposite to the first linear direction. Translation mechanism 52 engages supporting arm 40 and trolley housing 48 in such a manner that, in a first instance, the entire supporting arm 40 will move in unison with trolley housing 48 and in a second instance, the entire supporting arm 40 will move relative to the trolley housing 48 and thereby to the mounting assembly 38.

As best seen in FIG. 3, the first instance referred to above occurs when trolley housing 48 is rotated about axis "Z" in either direction indicated by arrow "A". This occurs when rotation motor 46 is actuated by the operator "P" using communication device 14. Since supporting arm 40 extends through the interior bore 48a of the trolley housing 48, as trolley housing 48 is rotated in either direction indicated by arrow "A", supporting arm 40 will be rotated in unison with trolley housing 48 in the same direction. In other words, when rotation motor 46 is actuated, the entire supporting arm 40 is rotated about axis "Z" and relative to mounting assembly 38 in either direction indicated by arrow "A".

The second instance referred to above occurs when first linear motor 50 is actuated and the translation mechanism 52 causes supporting arm 40 to move through bore 48a of trolley housing 48 in one or the other of a first direction and a second direction. This movement of supporting arm 40 is indicated by arrow "B" in FIGS. 2 and 3 and is a linear motion that is parallel to the longitudinal axis "X1" of supporting arm 40. The linear movement of supporting arm 40 is relative to the trolley housing 48 and thereby relative to the mounting assembly 38. The entire supporting arm 40 is moved linearly relative to the mounting assembly 38 when first linear motor 50 is actuated and thereby the first translation mechanism is actuated.

When rotation motor 46 is switched off, rotational motion of trolley housing 48 and thereby of supporting arm 40 ceases and supporting arm 40 remains in a fixed orientation relative to mounting assembly 38. When first linear motor 50 is switched off, linear motion of the supporting arm 40 relative to mounting assembly 38 ceases and supporting arm 40 remains in a fixed position relative to mounting assembly 38. The operator "P" is able to utilize communication device 14 to selectively rotate the entire supporting arm 40 from a first orientation (such as in FIG. 1B) to a second orientation (such as in FIG. 3), moving supporting arm 40 through an angle α (FIG. 3), for example. The operator "P" is also able to utilize communication device 14 to selectively linearly move the entire supporting arm 40 relative to mounting assembly 38 and thereby change the length of a portion of the supporting arm 40 that extends outwardly beyond a first side edge 48b (FIG. 3) of trolley housing 48.

Supporting arm 40 includes a first stop 40a at a first end and a second stop 40b at a second end. The first and second stops 40a, 40b are provided to limit the extent of linear travel of supporting arm 40 relative to trolley housing 48 and thereby to mounting assembly 38. For example, if supporting arm 40 moves linearly in a direction generally toward the operator "P", first stop 40a will eventually contact first side edge 48b of trolley housing 48 and then continued motion of supporting arm 40 in that direction will cease. In some embodiments a limit switch (not shown) or another similar mechanism) may be provided on side edge 48b of trolley housing 48 and contact of first stop 40a therewith will deactivate linear motor 50 and further linear motion of supporting arm 40 will be halted. Any other mechanisms may be provided on cleaning system 10 to selectively limit the extent of rotational motion of trolley housing 48 and/or limit the extent of linear motion of supporting arm 40.

Mounting assembly 38 further includes one or more sensors that are operatively linkable to communication device 14. These sensors may be in the form of wireless transmitters and/or receivers 54 that are operatively engaged with one or more of the rotation motor 46, first linear motor 50, and/or translation mechanism 52 and are able to be utilized to switch these components on or off. Position sensors may also be provided on mounting assembly 38 (and on other components of rotary tool 16) to provide information to communication device 14. The transmitters and/or receivers and other sensors utilized in cleaning system 10 will be referred to hereafter as "transceivers" but it should be understood that these components may perform both a transmitting function and a receiving function, a position sensing function, or only one of a transmitting function, a receiving function, and a positioning sensing function depending on what is required to activate or deactivate the associated component.

Transceivers 54 are operatively linked to communications device 14 by way of a transceiver 14a provided in communications device 14. Transceivers 54 and 14a may send and/or receive signals wirelessly or in any other suitable manner that enables the programming in communication device 14 to control rotation motion 46, first linear motor 50, and/or translation mechanism 52. The programming uploaded into communications device 14 is configured to cause the rotation motor 46, the first linear motor 50 and/or the translation mechanism 52 to be selectively switched on or off in order to cause rotational or linear motion of supporting arm 40 or to cause such motion to cease.

As indicated previously herein, cleaning system 10 further includes a carriage assembly 42 mounted on supporting arm 40 between mounting assembly 38 and second stop 40b. Carriage assembly 42 includes a carriage housing 56, a lance-mounting assembly 58, a second linear motor 60, and one or more transceivers 62. Supporting arm 40 extends through an interior bore 56a defined by carriage housing 56 and is operatively engaged therewith in a similar fashion to the way supporting arm 40 is engaged with trolley housing 48. Carriage housing 56 is able to be selectively moved along supporting arm 40 by the second linear motor 60 and the translation mechanism 52. In particular, a second gear 52c is operatively engaged with second linear motor 60 and with pinion 52b. Second linear motor 60 is activated to selectively rotate second gear 52c in one of a first rotational direction and a second rotational direction depending on which direction it is desired to move carriage assembly 42 relative to supporting rail. Translation mechanism 52 may be actuated to move carriage housing 56 linearly along the length and along the longitudinal axis "X1" of supporting arm 40. In particular, translation mechanism 52 is operable to move carriage housing linearly along the supporting arm 40 (parallel to longitudinal axis "X1") in a first direction towards the mounting assembly 38 or in a second direction away from the mounting assembly 38. This linear motion is indicated by the arrows "C" in FIGS. 2 and 3.

Lance-mounting assembly 58 and second linear motor 60 are provided on carriage housing 56. Consequently, when carriage housing 56 moves linearly along the length of supporting arm 40, lance-mounting assembly 58 and second linear motor 60 will move in unison with carriage housing 56.

Figure 4A:
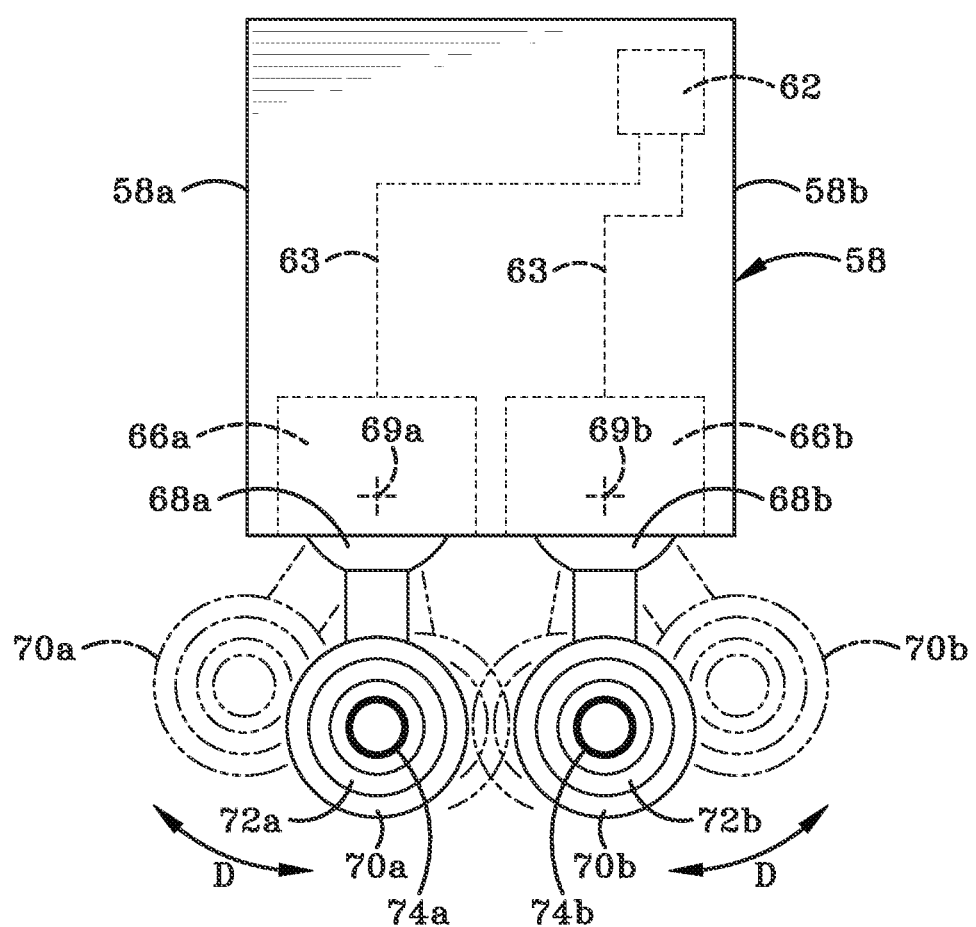
FIG. 4A is a top plan view of a lance-mounting assembly of the carriage assembly shown on its own and showing the lance holders and actuators that enable movement of the lances, and further illustrating lateral motion of the lance holders and lances relative to each other.
Figure 4B:
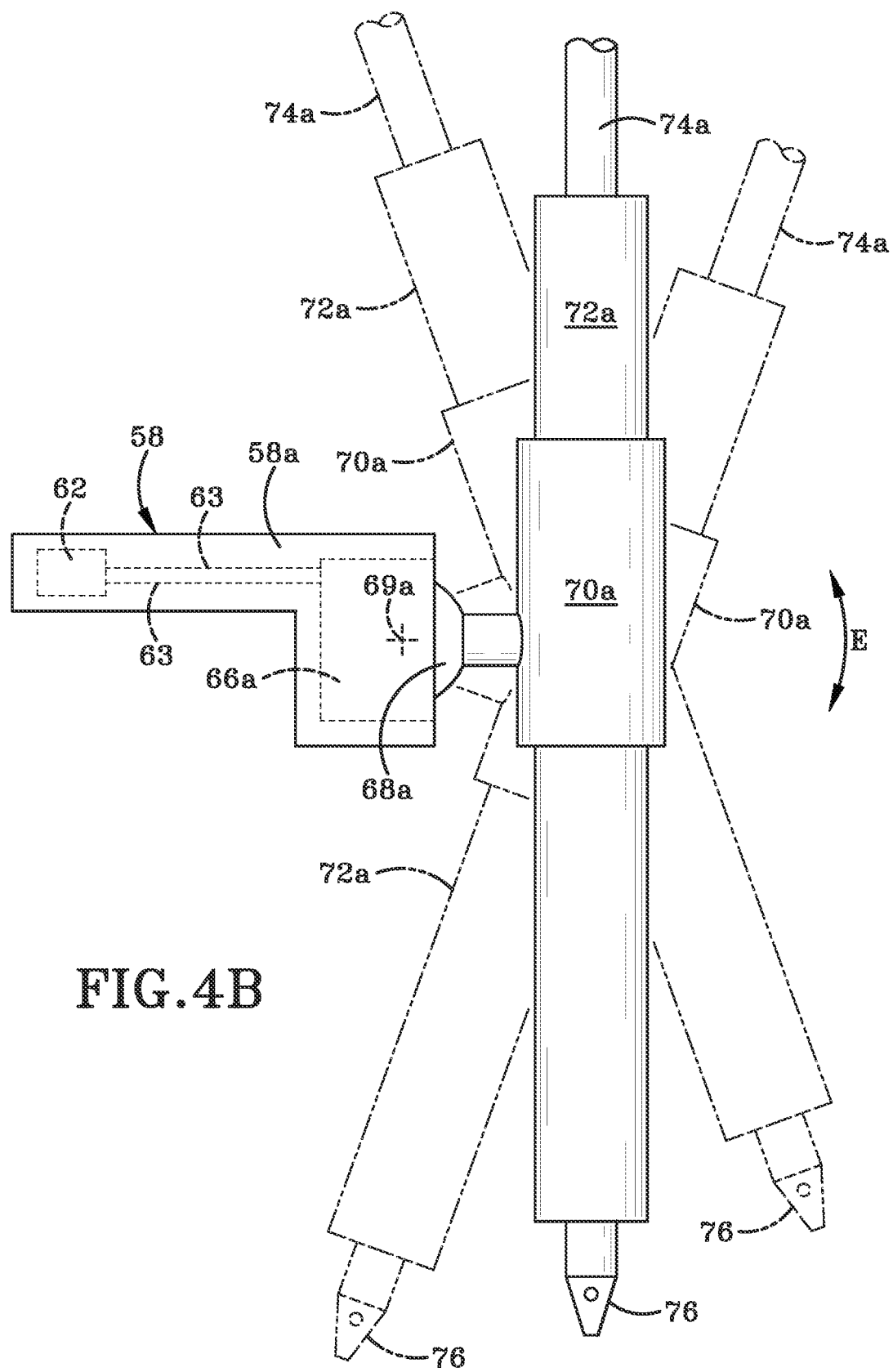
FIG. 4B is a side elevation view of the lance-mounting assembly of FIG. 4A showing the lance actuators pivoting the lances upwardly or downwardly relative to the lance-mounting assembly.

Lance-mounting assembly 58 is shown diagrammatically on its own in FIGS. 4A and 4B. Assembly 58 is shown as including two actuators 66a, 66b that are operatively engaged with one of the transceivers 62 via wiring 63. Although not illustrated herein, it should be understood that actuators 66a, 66b, and the transceiver 62 in assembly 58 are also operatively engaged with second linear motor 60. Each actuator 66a, 66b includes a connector 68a, 68b that operatively engages a lance holder 70a, 70b to the actuator 66a, 66b. As illustrated, but by way of example only, each connector 68a, 68b comprises a ball-and-socket type connector. Each lance holder 70a, 70b may include a sleeve 72a, 72b, respectively, into which a lance 74a, 74b is received. Each lance 74a, 74b is connected to one of the first and second hoses 18, 20 (FIG. 1B) and terminates in a nozzle, such as nozzle 76 (FIG. 46). The nozzle 76 is selectively insertable into one of the openings 34 in the face plate 34 of heat exchanger 28.

Second linear motor 60 is configured to drive actuators 66a, 66b in order to move lance holders 70a, 70b relative to lance-mounting assembly 58 and relative to each other. The operator "P" is able to move the lance holders 70a, 70b by activating the associated actuator 66a, 66b using communication device 14 and transmitting appropriate signals to transceiver 62 and second linear motor 60, thereby activating actuators 66a, 66b. FIG. 4A shows a first type of motion of the lance holders 70a, 70b that may be initiated by the operator "P" using communication device 14. In this instance, the operator "P" is able to pivot the two lance holders 70a, 70b laterally relative to each other and relative to the lance-mounting assembly 58. This pivotal motion is indicated by the arrows "D" in FIG. 4A. The operator "P" is able to selectively cause the two lance holders 70a, 70b to pivot inwardly toward each other or to pivot outwardly away from each other. In other words, the operator "P" is able to decrease or increase the lateral distance between the two lance holders 70a, 70b. The operator "P" is also able to select to pivot both of the two lance holders 70a, 70b in a first direction towards a first side edge 58a of lance-mounting assembly 58, or to pivot both of the two lance holders 70a, and 70b in a second direction towards a second side edge 58b of lance-mounting assembly 58. The lance holders 70a, 70b may be pivoted independently of one another to a greater or lesser degree, or they may be moved in unison. The manipulating of the position of the lance holders 70a, 70b and thereby of the lances 74a, 74b may be undertaken to enable the nozzles 76 thereon to be properly aligned with openings 34a in face plate 34 of heat exchanger 28.

FIG. 4B shows that actuators 66a, 66b are also able to be activated by the operator "P" to pivot lance holders 70a, 70b vertically upwardly or downwardly relative to lance-mounting assembly 58. This up or down movement is indicated by the arrow "E" in FIG. 4B. The vertically-oriented pivotal motion may be utilized if the carriage assembly 42 is to be moved linearly along the supporting arm 40 from a first position to a second position and the operator "P" does not want the nozzles 76 to accidentally contact face plate 34 of heat exchanger 28. In this instance, the operator "P" may then use communication device 14 to send one or more signals to transceiver 62 and thereby activate second linear motor 60 and the actuators 66a, 66b to pivot the lance holders 70a, 70b vertically upwardly away from the face plate 34. This motion will lift the nozzles 76 clear of the face plate 34. The carriage assembly 42 is then moved linearly along the supporting arm 40 to its new position by the operator "P" using the communication device 14 to activate one or both of the second translation mechanism 65 or the second linear motor 60. When carriage assembly 42 arrives at the desired position on supporting arm 40, the operator "P", using communication device 14, will activate the actuators 66a, 66b to pivot the lance holders 70a, 70b downwardly so that the nozzles 76 are oriented correctly to introduce high pressure fluid into the openings 34a in the face plate 34. It will be understood that because ball-and-socket connectors 68a, 68b are utilized on lance-mounting assembly 58, a variety of other different motions of lance holders 70a, 70b are possible.

It will be understood that lance-mounting assembly 58 may be provided with only one lance holder and associated lance or, in other embodiments, may be provided with more than two lance holders and associated lances. It will further be understood that any suitable type of connector other than the ball-and-socket connectors 68a, 68b illustrated herein may be provided on lance-mounting assembly 58.

The operator "P" is able to control the linear movement of carriage housing 56 along the length of supporting arm 40 by utilizing the programming provided in communication device 14. As mentioned earlier herein, the possible linear movement of carriage assembly 42 relative to supporting arm 40 is indicated by the arrows "C" shown in FIG. 3. In a first scenario, the operator may elect to keep carriage assembly 42 in a particular location relative to the length of supporting arm 40 (where the length is measured between the first stop 40a and second stop 40b). In this first scenario, the operator "P" does not activate the second linear motor 60 using communication device and therefore the carriage assembly 42 remains in a fixed position relative to supporting arm 40. In other words, carriage assembly 42 will be located a first distance away from the mounting assembly 38. In a second scenario, the operator "P" actuates the second linear motor 60 and causes the carriage assembly 42 to selectively move either towards mounting assembly 38 or away from mounting assembly 38. Moving the carriage assembly 42 along the supporting arm 40 helps the operator "P" correctly position the lances 74a, 74b so that the nozzles 76 thereon are properly aligned with particular openings 34a on the face plate 34 of heat exchanger 28.

The operator "P" is therefore able to use communication device 14 and the programming provided therein to select whether to perform one or more movement operations to align the nozzles 76 with a selected particular openings 34a on the face plate 34. In other words, the operator "P" selects whether to perform one or more of rotating the supporting arm 40 relative to the mounting assembly 44, linearly moving the supporting arm 40 relative to the mounting assembly 44, or linearly moving the carriage assembly 44 along the supporting arm 40 in order to access any particular opening 34a on the face plate 34.

U.S. patent application Ser. No. 16/265,387, now U.S. Pat. No. 10,747,238, describes in detail how the operator "P" is able to initially setup the communication device 14 and rotary tool 16 in such a way for the programming in the communication device 14 to learn the pattern of the openings 34a in the face plate 34 of the heat exchanger 28. (The present application claims priority from U.S. patent application Ser. No. 16/265,387, now U.S. Pat. No. 10,747,238, and the entire disclosure thereof is incorporated herein by reference). U.S. Ser. No. 16/265,387, now U.S. Pat. No. 10,747,238, discloses the use of two supporting arms oriented at right angles to each other and moving the trolleys and carriages in such a way that the communication device's software will learn the pattern of the openings. In this presently disclosed cleaning system 10, the operator "P" will utilize the communication device 14 to control the rotational and/or linear motion of the supporting arm 40, and/or the linear motion of the carriage assembly 42 relative to the supporting arm 40, and/or the rotational motion of the lance holder relative to the carriage assembly. These various controlled motions may be utilized to locate the positions of a sample of openings 34a in face plate 34. The software will track and learn the pattern of the openings 34a in the face plate 34 and will store the same in the memory of the communication device 14. The pattern that is stored in the communication device corresponds to the arrangement of the openings 34a in the face plate 34. The learning of the pattern may occur in a substantially similar manner to the method disclosed in the parent application.

The learning of the pattern of the openings 34a may also be accomplished using one or more cameras, lasers, distance sensors, or other sensors or equipment provided on the fluid jet machine or on the heat exchanger itself that can map out or determine the pattern of openings 34a in the face plate 34 and store that information in the communication device's memory. In other instances, the pattern of openings in the face plate of any number of different heat exchangers may be uploaded to the communication device 14 and the operator will simply select which pattern of openings applies to the heat exchanger to be cleaned at that time.

After the pattern of the openings 34a in the face plate 34 has been learned and stored in the communication device's memory (or uploaded and accessed), the operator "P" is able to initiate a cleaning operation. Using The LUNCHBOX® program disclosed in the parent application, the operator "P" will move the supporting arm 40 and/or carriage assembly 42 to successively bring the lances 74a, 74b into alignment with different openings 34a in the face plate 34. The operator will furthermore use THE LUNCHBOX® program to cause a high pressure water jet to be delivered through each nozzle 76 and through the openings 34a and into the bores 30a of the associated tubes 30 in the heat exchanger 28. The high pressure water jets will scour deposits of material from the interior surfaces of the tubes 30 with which the lances 74a, 74b are aligned. In other instances, the operator of the communication device will initiate the cleaning operation and the programming will automatically and progressively move the lances 74a, 74b from one opening in the face plate 34 to the next until the heat exchanger tubes 30 have all been cleaned. In other words, in some instances, the programming in the communication device will be manually used by the operator to control the cleaning operation. In other instances, the programming in the communication device will automatically and systematically control the cleaning operation, once initiated by the operator.

FIG. 1B shows supporting arm 40 of rotary tool 16 in a first position and first orientation that has the longitudinal axis "X1" of supporting arm 40 orientated along horizontal axis "X", a first length "L1" (FIG. 2) of supporting arm 40 extends outwardly beyond first side edge 48b of trolley housing 48, and lance-mounting assembly 58 is located proximate second stop 40b on supporting arm 40. Additionally, lance holders 70a, 70b are located a first distance away from each other. FIG. 3 shows supporting arm 40 of rotary tool 16 moved to a second position and second orientation relative to face plate 34. In particular, the entire supporting arm 40 has been rotated through an angle α relative to the first position shown in FIG. 1B. The longitudinal axis "X1" of the supporting arm 40 is now oriented at the angle α relative to the horizontal axis "X". Additionally, the entire supporting arm 40 has been moved linearly relative to mounting assembly 38 such that a second length "L2" of supporting arm 40 extends outwardly beyond first side edge 48b of trolley housing 48. The second length "L2" is greater than the first length "L1". Furthermore, the carriage assembly 42 has been moved linearly along the longitudinal axis of the supporting arm 40 in a direction away from second stop 40b. As a consequence, carriage assembly 42 is no longer proximate second stop 40b. Still further, lance holders 70a, 70b have been pivoted laterally away from each other so that they are now further apart from each other. All of these movements have been initiated and controlled by the operator "P" utilizing the communication device 14.

Figure 5:
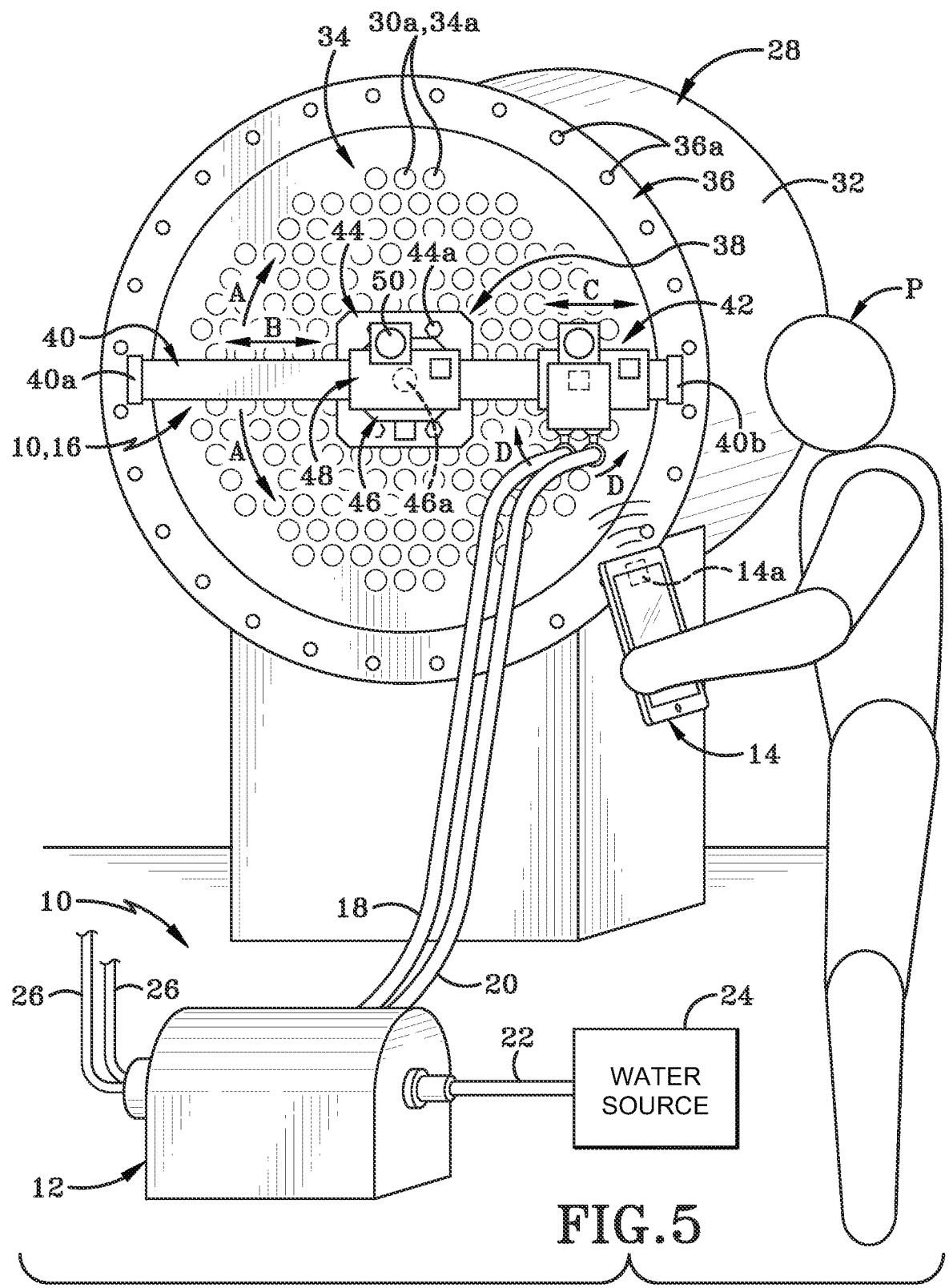
FIG. 5 is a diagrammatic front elevation view of the first embodiment of the rotary tool with a smart indexing controller where the mounting assembly is engaged with a central region of the face plate of the heat exchanger.

FIG. 5 shows the cleaning system 10 of FIGS. 1A-4B where the mounting assembly 38 is engaged with a central region of face plate 34 of the heat exchanger 28 instead of being mounted to face plate 34 proximate flange 36. All components of cleaning system 10 shown in FIG. 5 are identical to the components shown and described with respect to FIGS. 1-4B.

Figure 6:
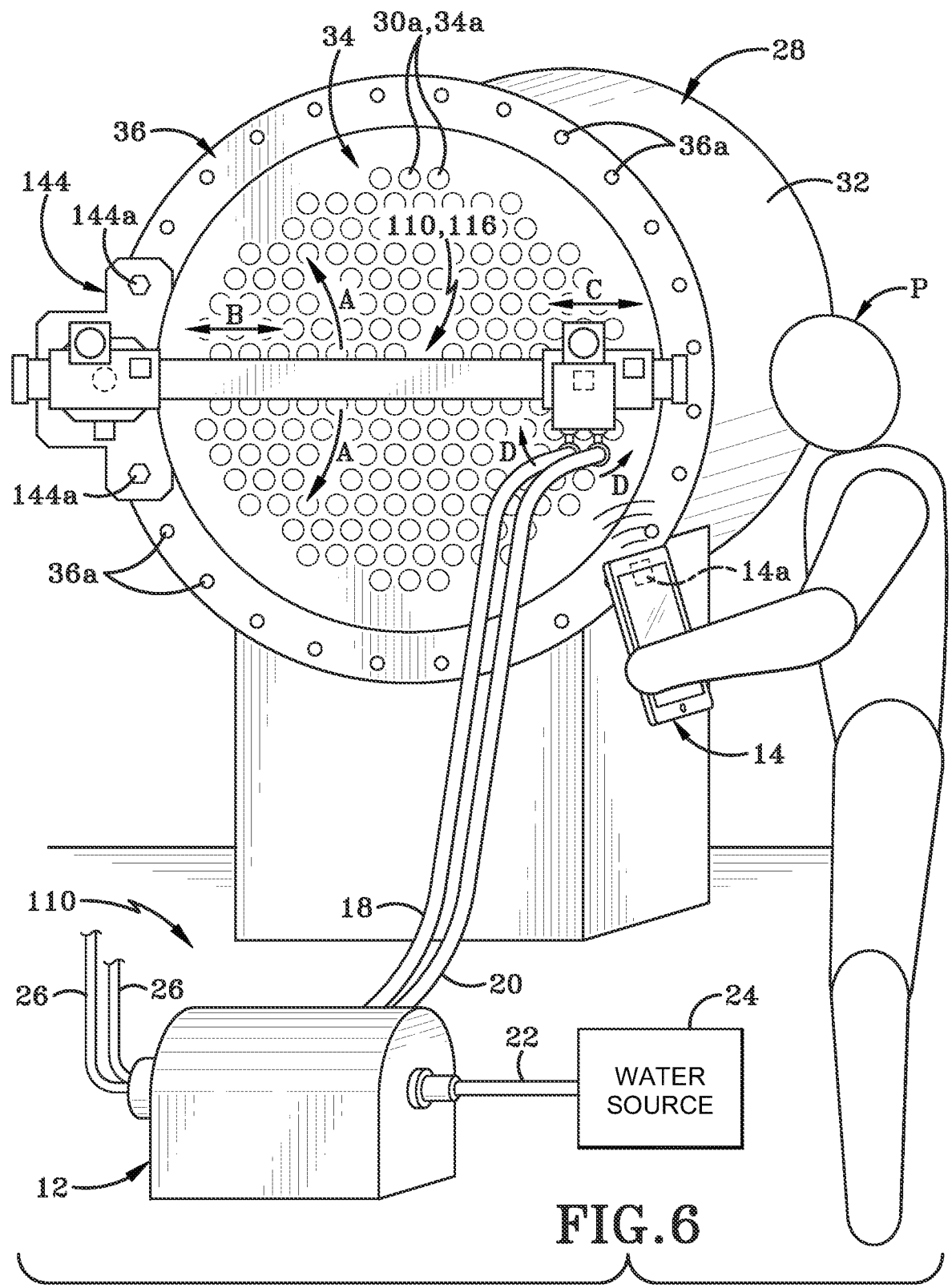
FIG. 6 is a diagrammatic front elevation view of a second embodiment of a rotary tool with a smart indexing controller in accordance with the present disclosure.

Referring now to FIG. 6, there is shown a second embodiment of a cleaning system 110 in accordance with the present disclosure. Cleaning system 110 comprises the water delivery system 12, communication device 14, and a second embodiment of a rotary tool in accordance with the present disclosure, generally indicated at 116. Rotary tool 116 is substantially identical to rotary tool 16 except for the mounting plate that is utilizing to secure rotary tool 116 to heat exchanger 28. FIG. 6 shows a mounting plate 144 configured to enable rotary tool 116 to be secured to the flange 36 of the heat exchanger 28 instead of to the face plate 34. Fasteners 144a are used to secure the differently configured mounting plate 144 to flange 36. Fasteners 144a may simply be bolts that are inserted into the apertures 36a of flange 36 and secured in place by nuts. All of the other components of the rotary tool 116 other than mounting plate 144 are identical to the components of rotary tool 16 and therefore will not be further described herein. Rotary tool 116 functions in the identical manner to rotary tool 16 and the functioning thereof will not be described further herein.

Figure 7:
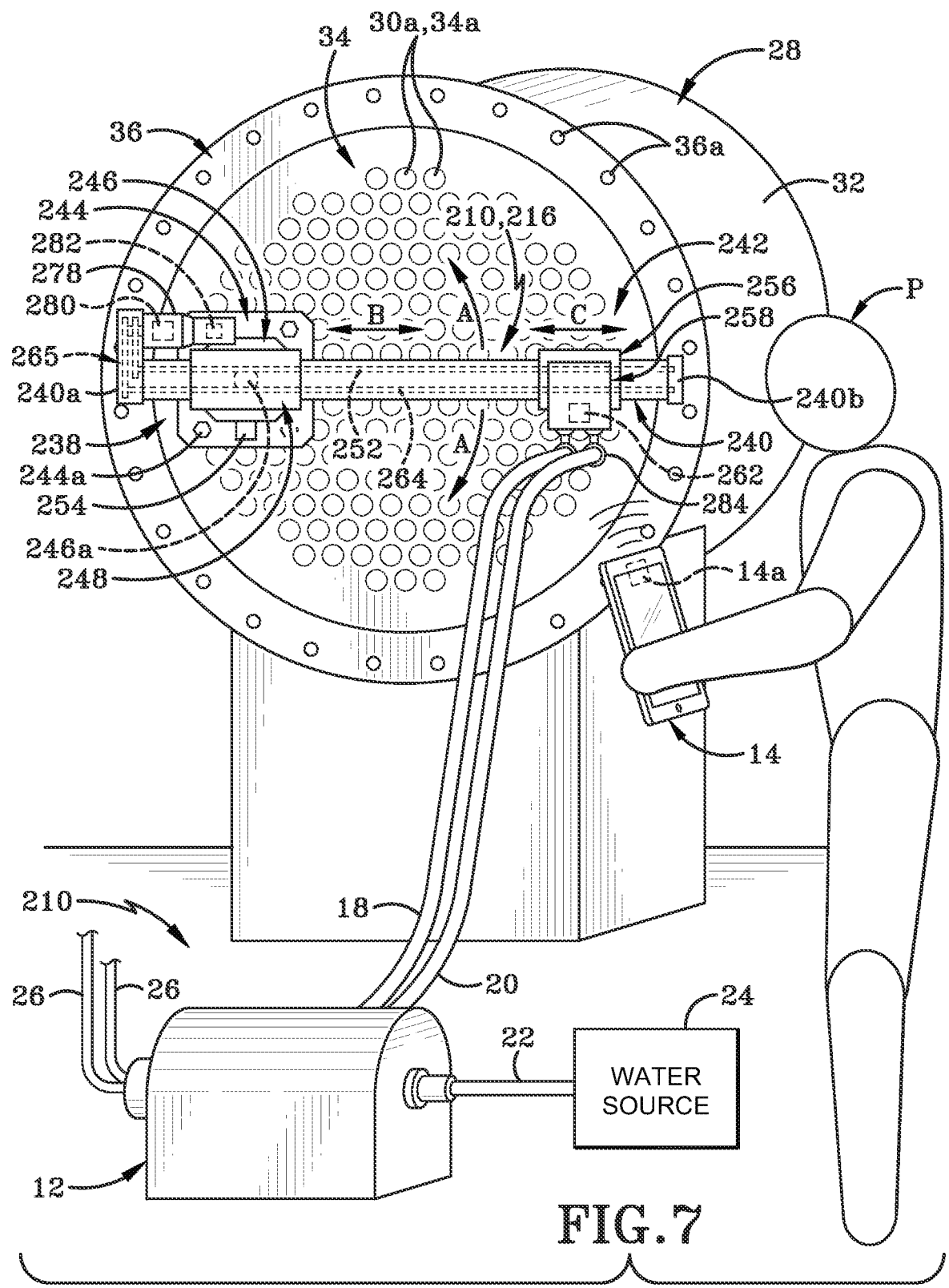
FIG. 7 is a diagrammatic front elevation view of a third embodiment of a rotary tool with a smart indexing controller in accordance with the present disclosure.

Referring now to FIG. 7, there is shown a third embodiment of a cleaning system 210 in accordance with the present disclosure. Cleaning system 210 comprises the water delivery system 12, communication device 14, and a third embodiment of a rotary tool in accordance with the present disclosure, generally indicated at 216. Rotary tool 216 comprises a mounting assembly 238, a supporting arm 240, and a carriage assembly 242.

Mounting assembly 238 includes a mounting plate 244 that is substantially identical in structure and function to mounting plate 44 and therefore will not be described further herein. Suffice to say that mounting plate 244, like mounting plate 44, can be secured at any location on face plate 34 of heat exchanger 28. The location of mounting plate 244 on face plate 34 in FIG. 7, like the location of mounting plate 44 on face plate 34 in FIG. 1B, should be considered to be exemplary.

Mounting assembly 238 includes a rotation motor 246 provided on an upper surface of mounting plate 244. Rotation motor 246 engages supporting arm 240. Mounting assembly 238 further includes a transceiver 254 to operatively link rotation motor 246 to communication device 14. Rotation motor 246 is substantially identical in structure and function to rotation motor 46 and transceiver 254 is substantially identical in structure and function to transceiver 54. Rotation motor 246 includes a drive shaft 246a which extends outwardly and upwardly from rotation motor 246 and is oriented at right angles to the upper surface of mounting plate 244. Mounting assembly 238 further includes a trolley housing 248 operatively engaged with the drive shaft 246a of rotation motor 246. Operator "P" activates rotation motor 246 utilizing the programming of communication device 14 through transceivers 14a. Upon activation of rotation motor 246, trolley housing 248 is selectively rotated by drive shaft 246a about an axis extending along drive shaft 246a in a substantially identical manner to how trolley housing 48 is rotated by drive shaft 46a, previously described herein. Rotation motor 246 may be actuated to selectively rotate trolley housing 248 in one of a clockwise direction and a counter-clockwise direction about axis. The possible directions of rotation of trolley housing 248 are indicated by the arrows "A" in FIG. 7.

Although not shown herein, supporting arm 240 extends through an interior bore defined by trolley housing 248, substantially identical to the way supporting arm 40 extends through interior bore 48*a* of trolley housing 48. Supporting arm 240 includes a first stop 240*a* at a first end and a second stop 240*b* at a second end. The first and second stops 240*a*, 240*b* are provided to limit the extent of linear travel of supporting arm 240 relative to trolley housing 248 and thereby to mounting assembly 238 and serve a similar purpose to stops 40*a* and 40*b* on supporting arm 40. Carriage assembly 242 is mounted on supporting arm 240 in a location between second stop 240*b* and mounting assembly 238. (Carriage assembly 242 will be described in greater detail later herein.)

Cleaning system 210 further comprises a first translation mechanism 252 and a second translation mechanism 264 that are provided on supporting arm. Both of the first translation mechanism 252 and second translation mechanism 264 are operatively engaged with the single linear motor 278 via a drive assembly 265 and switching mechanism 280. Each of the first and second translation mechanisms 252, 264 is illustrated as comprising a rotatable threaded rod that is provided within/on supporting arm 240. Each threaded rod is operably engaged with a chain and sprocket system provided in drive assembly 265. Linear motor 278 is operably engaged with a first set of chains and sprockets and a second set of chains and sprockets of drive mechanism 265. The first set of chains and sprockets are operably linked to the threaded rod of the first translation mechanism 252. The second set of chains and sprockets are operably linked to the threaded rod of the second translation mechanism 264. Selective actuation of linear motor 278 will drive the rotation of the threaded rod of first translation mechanism 252 or selectively drive the rotation of the threaded rod of second translation mechanism 264. The first or second translation mechanism 252, 264 will be actuated depending on whether the supporting arm 240 is to be moved linearly relative to the mounting assembly 238 or the carriage assembly 242 is to be moved linearly relative to the supporting arm 240. A transceiver 282 provided on linear motor 278 operatively links linear motor 278 and switching mechanism 280 to communication device 14 via transceiver 14*a*. Switching mechanism 280 may be utilized to selectively activate either the first set of chains and sprockets or the second set of chains and sprockets in drive assembly 265. When first translation mechanism 252 is activated, linear motion of supporting arm 240 relative to mounting assembly 238 is produced. This linear motion is indicated by the arrows "B" in FIG. 7. When second translation mechanism 264 is activated, linear motion of carriage assembly 242 relative to supporting arm 240 is produced. This linear motion is indicated by the arrows "C" in FIG. 7.

It will be understood that any other suitable types of translation mechanism and drive mechanism may be utilized as first translation mechanism 252 and second translation mechanism 264 and the drive mechanism 265. For example, one or both translation mechanism 252, 264 may be a rack and pinion system or a rotating screw and gear mechanism. In some embodiments, the first and second translation mechanisms 252, 264 may comprise a single translation mechanism that is independently engaged with supporting arm 240 and carriage assembly 242 and is separately activated.

The programming uploaded into communications device 14 is configured to cause the rotation motor 246, the linear motor 278, the first translation mechanism 252, and second translation mechanism 264 to function. As with the rotary tool 16, in rotary tool 216, the entire supporting arm 240 is selectively rotated relative to the mounting assembly 238 by rotation motor 246; the entire supporting arm 240 is selectively linearly moved relative to the mounting assembly 238 by the first translation mechanism 252 and linear motor 278, and the carriage assembly 242 is selectively moved along the longitudinal axis of supporting arm 240 toward and away from the mounting assembly 238 by the second translation mechanism 264 and the linear motor 278.

Carriage assembly 242 includes a carriage housing 256, a lance-mounting assembly 258, and one or more transceivers 262. Supporting arm 240 extends through an interior bore (not shown but similar to bore 56*a*) defined by carriage housing 256 and is operatively engaged therewith in a similar fashion to the way supporting arm 240 is engaged with trolley housing 248. Carriage housing 256 is able to be selectively move linearly along the supporting arm 240 (parallel to the arm's longitudinal axis) in a first direction towards the mounting assembly 238 or in a second direction away from the mounting assembly 238 by linear motor 278 and second translation mechanism 264. Lance-mounting assembly 258 is provided on carriage housing 256 and includes one or more lance holders 284 thereon. Each lance holder 284 is configured to receive a lance that is connected to one of the hoses 18, 20 of the water delivery system 12. When carriage housing 256 moves linearly along the length of supporting arm 240, lance-mounting assembly 258 and therefore lance holders 284 and the associated lances will move in unison with carriage housing 256. The lance holders 284 may be substantially identical to lance holders 70 described earlier herein. In this instance, an additional motor may be required on carriage assembly 242 to drive movement of the lance holders relative to lance-mounting assembly 258. In other instances, lance holders 284 may be static components that remain in a fixed orientation relative to lance-mounting assembly 258.

The operator "P" will utilize communications device 14 and the specialized programming therein to perform a cleaning operation on the heat exchanger 28 using cleaning system 210 in a substantially identical manner to the method of performing a cleaning operation utilizing the cleaning system 10.

Figure 8A:
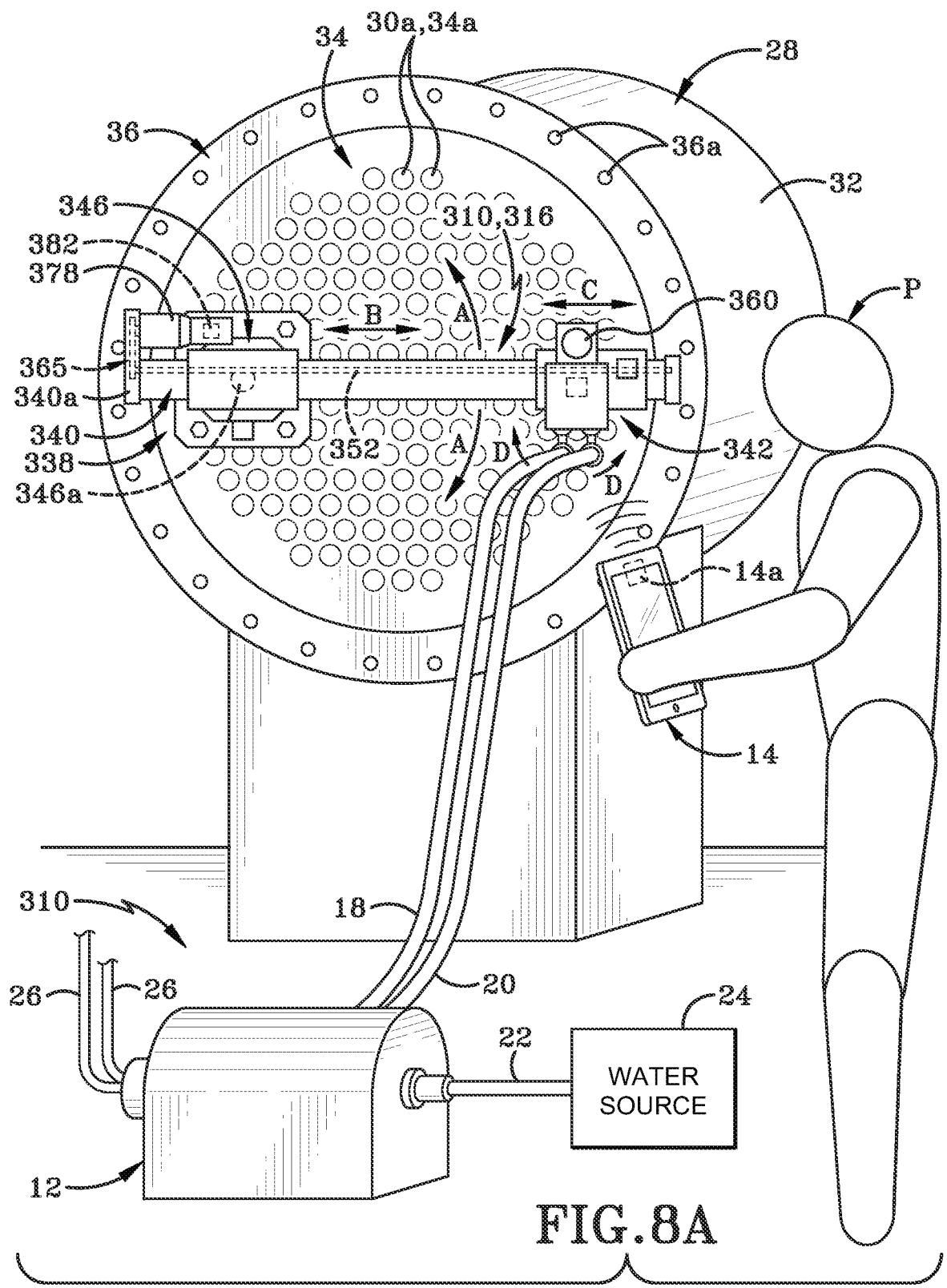
FIG. 8A is a diagrammatic front elevation view of a fourth embodiment of a rotary tool with a smart indexing controller in accordance with the present disclosure.

Referring now to FIG. 8A, there is shown a fourth embodiment of a cleaning system 310 in accordance with the present disclosure. Cleaning system 310 comprises the water delivery system 12, communication device 14, and a fourth embodiment of a rotary tool in accordance with the present disclosure, generally indicated at 316. Rotary tool 316 comprises a mounting assembly 338, a supporting arm 340, and a carriage assembly 342.

Rotary tool 316 is substantially identical to rotary tool 216 except that instead of providing the single linear motor 278 on supporting arm 240, a first linear motor 360 is provided on the carriage assembly 342 and a second linear motor 378 is provided on mounting assembly 338. A single translation mechanism 352 is provided in supporting arm and each of the first linear motor 360 and second linear motor 378 is engaged with translation mechanism 352. A drive mechanism 365 operatively engages translation mechanism 352 and second linear motor 378. The drive mechanism 365 is substantially similar to drive mechanism 265 except that only one set of sprockets and chains is provided in drive mechanism 365. Consequently, no switching mechanism similar to switching mechanism 280 is required in cleaning system 310 but a transceiver 382 (similar to transceiver 282) is provided for communication with communication device 14. Linear motor 378 is utilized to selectively cause linear motion of the entire supporting arm 340 relative to mounting assembly 338. Linear motor 360 is utilized to cause linear motion of carriage assembly 342 along supporting arm 340. A rotation motor 346 is provided as part of mounting assembly 238 to selectively rotate the entire supporting arm 340 relative to the mounting assembly 238. The structure and function of all other components of cleaning system 310 are substantially identical to the components of cleaning system 10, 110, or 210.

Figure 8B:
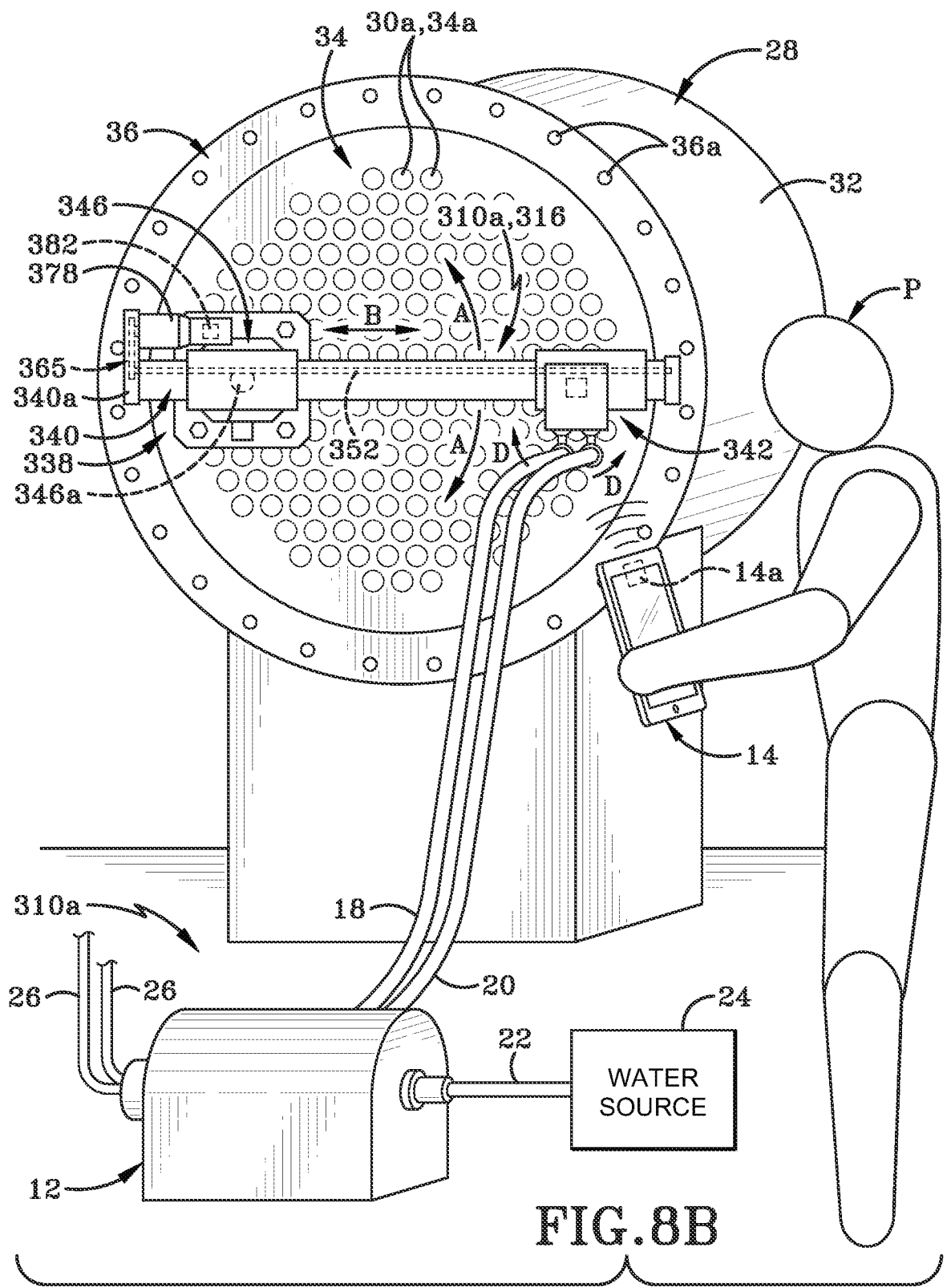
FIG. 8B is a diagrammatic front elevation view of a variant of the fourth embodiment of the rotary tool shown in FIG. 8A, where the linear motor on the carriage assembly has been omitted.

FIG. 8B shows a variant of the fourth embodiment cleaning system 310a in accordance with the present disclosure. In this variant, the structure of the cleaning system 310a is substantially identical to the cleaning system 310 shown in FIG. 8A except the linear motor 360 is omitted. In the variant fourth embodiment shown in FIG. 8B, carriage assembly 342 is fixedly engaged with the supporting arm 340 and does not move along the longitudinal axis relative to the supporting arm 340. Instead, the carriage assembly 342 remains in a fixed position on the supporting arm 340. The carriage assembly 34s is therefore only movable relative to the mounting assembly 338 when the entire supporting arm 340 rotates relative to the mounting assembly 338 (as indicated by the arrows "A") or moves linearly relative to the mounting assembly 338 (as indicated by the arrows "B"). Other than the lack of motion of the carriage assembly 342 along the supporting arm 340, all other structures and functions of the cleaning system 310a are identical to the cleaning system 310 disclosed in FIG. 8A and discussed above.

Figure 8C:
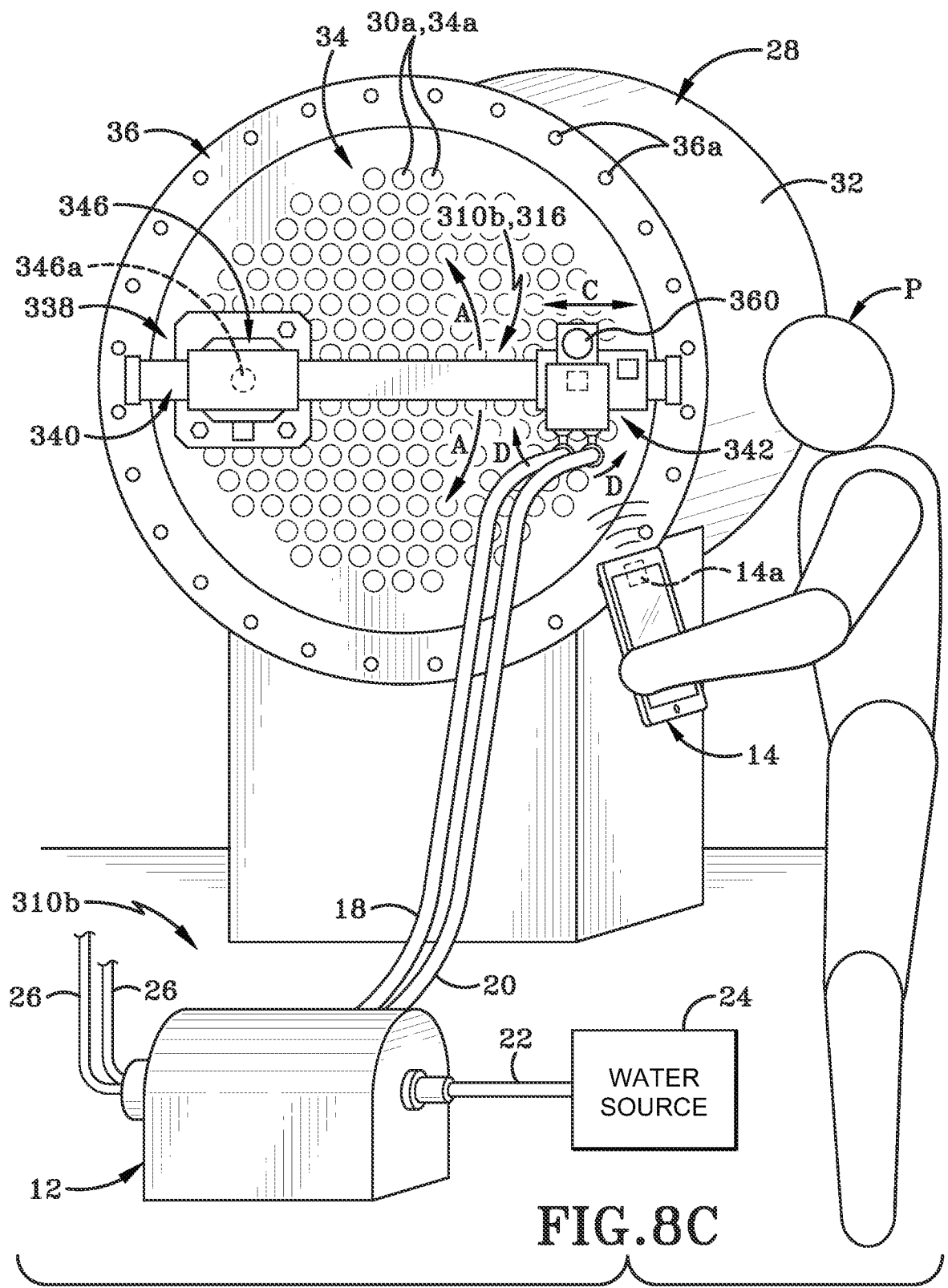
FIG. 8C is a diagrammatic front elevation view of a second variant of the fourth embodiment of the rotary tool shown in FIG. 8A, where the linear motor that operatively engages the supporting arm to the mounting assembly is omitted.

FIG. 8C is a diagrammatic front elevation view of a second variant of the fourth embodiment of the rotary tool shown in FIG. 8A. In this second variant the cleaning system 310b is substantially identical to the cleaning system 310 shown in FIG. 8A except that the translation assembly 352, drive assembly 365, and linear motor 378 are omitted. The supporting arm 340 is pivotally engaged with the mounting assembly 338 and is able to be rotated relative to the mounting assembly 338 by the rotation motor 346 but the supporting arm 340 does not move linearly relative to the mounting assembly 338. Carriage assembly 342 is able to be moved linearly along supporting arm 340 by linear motor 360. All other structures and functions of the cleaning system 310b are as described with respect to the cleaning system 310 shown in FIG. 8A.

Figure 9:
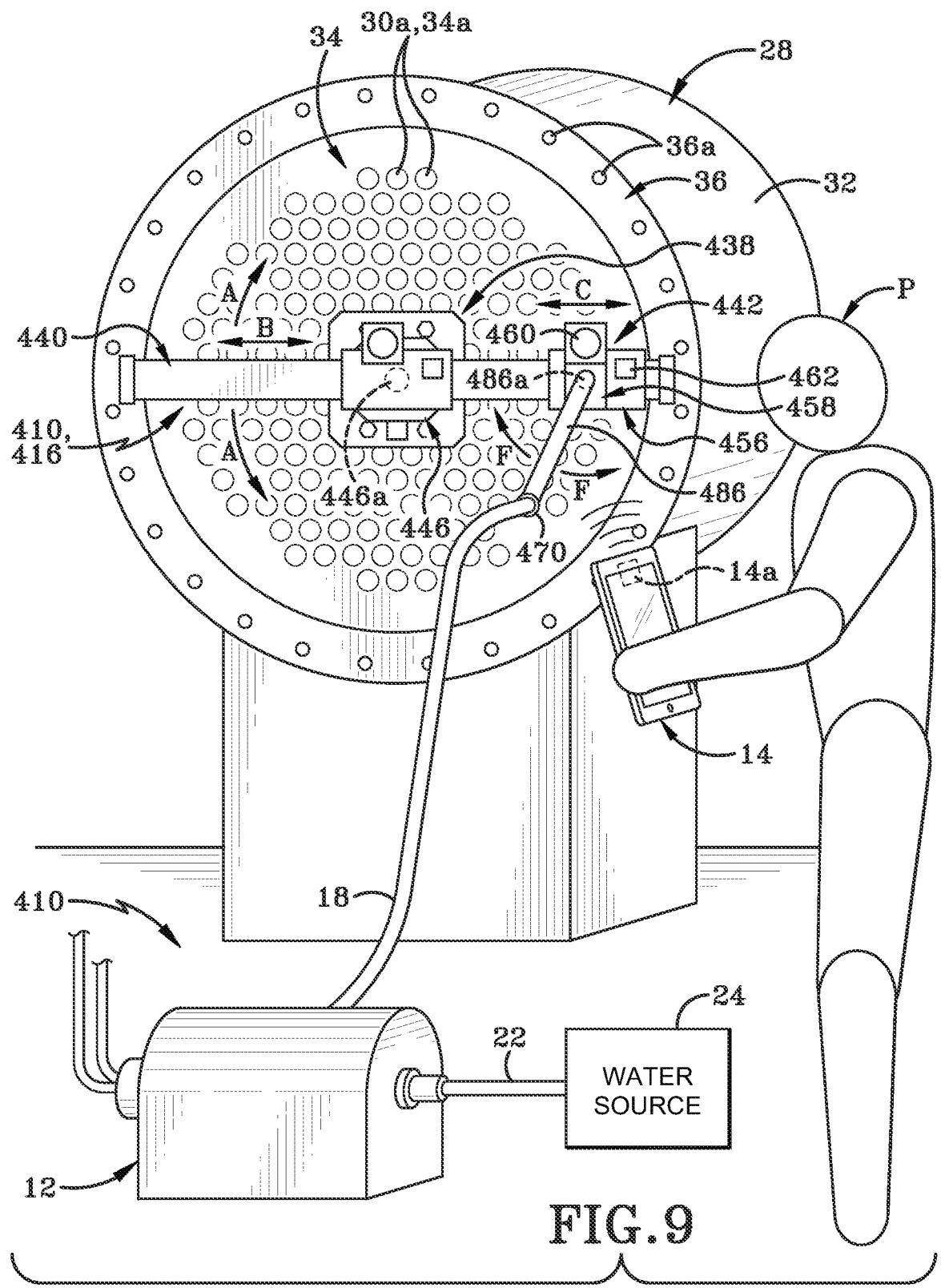
FIG. 9 is a diagrammatic front elevation view of a fifth embodiment of a rotary tool with a smart indexing controller in accordance with the present disclosure.

Referring now to FIG. 9, there is shown a fifth embodiment of a cleaning system 410 in accordance with the present disclosure. Cleaning system 410 comprises the water delivery system 12, communication device 14, and a fifth embodiment of a rotary tool in accordance with the present disclosure, generally indicated at 416. Rotary tool 416 comprises a mounting assembly 438, a supporting arm 440, and a carriage assembly 442.

Mounting assembly 438 is illustrated as being substantially identical in structure and function to mounting assembly 38 and therefore will not be described in any further detail herein. Similarly, supporting arm 440 is substantially identical in structure and function to supporting arm 40 and therefore will not be described in further detail herein. At least one translation mechanism is provided in rotary tool 416 that may be substantially identical to any of the translation mechanisms described herein.

It will be understood that in other embodiments, mounting assembly 438 may be substantially identical in structure and function to mounting assembly 238 or 338 and in either instance a complementary supporting arm 240 or 340 will be utilized to function with the particular mounting assembly 238, 338.

In the fifth embodiment rotary tool 416, carriage assembly 442 includes a carriage housing 456, a lance-mounting assembly 458, a second linear motor 460, and one or more transceivers 462. The carriage housing 456 and second linear motor 460 provided on carriage assembly 442 are substantially identical in structure and function to carriage housing 56 and second linear motor 60. Second linear motor 60 is able to be activated by the operator "P" using communications device and via signals passing wirelessly from transceiver 14a to transceiver 462. Carriage assembly 442 differs from carriage assembly 42 in the structure of lance-mounting assembly 458 and its associated lance holder 470. In rotary tool 416, an arm 486 extends outwardly from lance-mounting assembly 458 and is operatively engaged with second linear motor 60. Arm 486 is rotatably mounted to lance-mounting assembly 458 and is able to be rotated about an axis that extends along pivot 486a, and is parallel to the axis extending along the drive shaft 446a of the rotation motor 446. The rotational motion of the arm 486 is indicated by arrows "F" in FIG. 9. Arm 486 will rotate in response to activation of second linear motor 460. Lance holder 470 is fixedly mounted proximate a free end of arm 486 and is configured to receive a lance therein such that a nozzle on the lance extends downwardly from lance holder 470 in a similar manner to the nozzles 76 in FIG. 2.

The operator "P" is able to control the position of lance holder 470 using communication device 14 and the specialized software stored therein. In particular, the operator and programming is able to control rotation of the entire supporting arm 440 relative to mounting assembly 438, to control linear motion of the entire supporting arm 440 relative to mounting assembly 438, to control linear motion of the carriage assembly 442 along the length of supporting arm 440. The operator and programming are also able to control the rotational motion of the arm 486 about the axis 486a on the lance-mounting assembly 458. The operator "P" thereby controls the position of the lance relative to the carriage assembly 442 and mounting assembly 438. Using communications device 10 and by selecting to perform the various motions of supporting arm 440, carriage assembly 442, and arm 486, the operator "P" is able to teach the software the pattern of the openings 34a in the face plate 34. The operator "P" is thereby also able to correctly position the nozzle of the lance in order to deliver a high-pressure jet of water therethrough during a cleaning operation.

It will be understood that in other embodiments, more than one lance holder 470 may be fixedly engaged with the free end of the rotatable arm 486.

Figure 10:
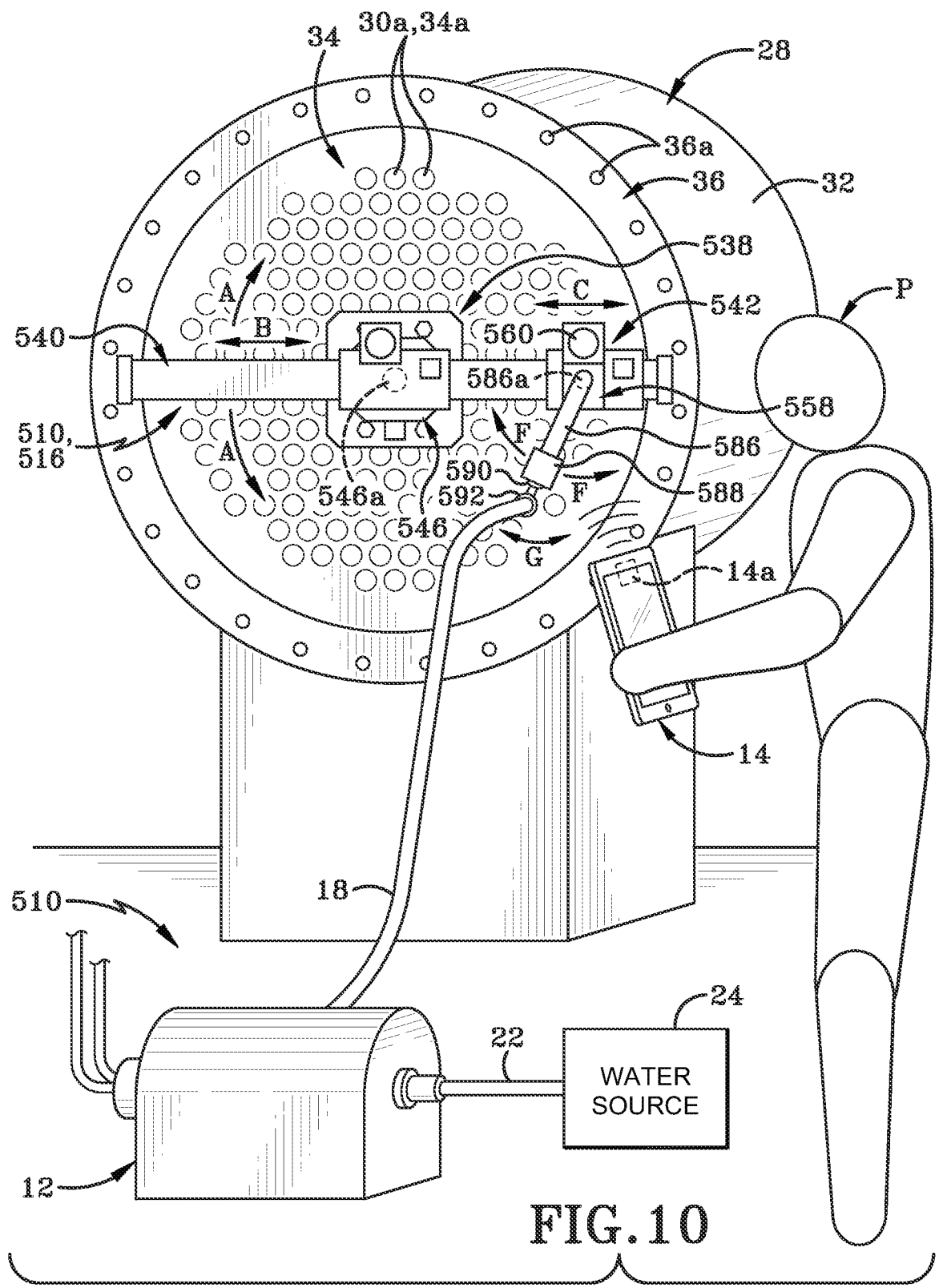
FIG. 10 is a diagrammatic front elevation view of a sixth embodiment of a rotary tool with a smart indexing controller in accordance with the present disclosure.

Referring now to FIG. 10, there is shown a sixth embodiment of a cleaning system 510 in accordance with the present disclosure. Cleaning system 510 comprises the water delivery system 12, communication device 14, and a sixth embodiment of a rotary tool in accordance with the present disclosure, generally indicated at 516. Rotary tool 516 comprises a mounting assembly 538, a supporting arm 540, and a carriage assembly 542.

Rotary tool 516 is substantially identical to rotary tool 416 and functions in substantially the same manner as rotary tool 416 except in the structure and functioning of a rotatable arm 586. Arm 586 is engaged with carriage assembly 542 in the same manner as arm 486 is engaged with carriage assembly 442 and is rotatable (as indicated by arrows "F") about an axis 586a that is oriented parallel to the axis extending along the drive shaft 546a of rotation motor 546. The free end of arm 586 differs from the free end of arm 486. In particular, arm 586 includes an actuator 588, a connector 590, and a lance holder 592 that are substantially identical in structure and function to one of the actuators 66a, 66b, and respective connector 68a, 68b and lance holder 70a, 70b shown in FIGS. 4A and 4B. The actuator 588 is operatively engaged with second linear motor 560 and is manipulated thereby in order to pivot lance holder 592 relative to arm 586. Several motions of components of rotary tool 516 are therefore able to be controlled by the operator "P" using the communication device 14 and the special programming therein. The entire supporting arm 540 is able to be rotated relative to mounting assembly 538 as indicated by arrow "A" in FIG. 10. Additionally, the entire supporting arm 540 is able to be moved linearly relative to the mounting assembly 538 in the directions indicated by the arrows "B"; the carriage assembly 542 is able to be moved linearly along the longitudinal axis of the supporting arm 540 in the directions indicated by the arrows "C"; the arm 586 on carriage assembly 542 is able to be rotated relative to the lance-mounting assembly 558 in the directions indicated by the arrows "F", and the lance-holder 592 is able to be pivoted relative to the actuator 588 on the lance-mounting assembly 558. The pivotal motion of the lance-holder 592 relative to the lance-mounting assembly 558 is indicated by the arrows "G" in FIG. 10.

Again, all of the various possible motions of the components of rotary system 516 are able to be utilized by the operator "P" controlling the communication device 14 in order to teach the software the pattern of openings 34a in the face plate 34 of the heat exchanger. The software is then able to accurately maneuver the nozzle on the lance held in the lance holder 592 to perform a cleaning operation.

Figure 11:
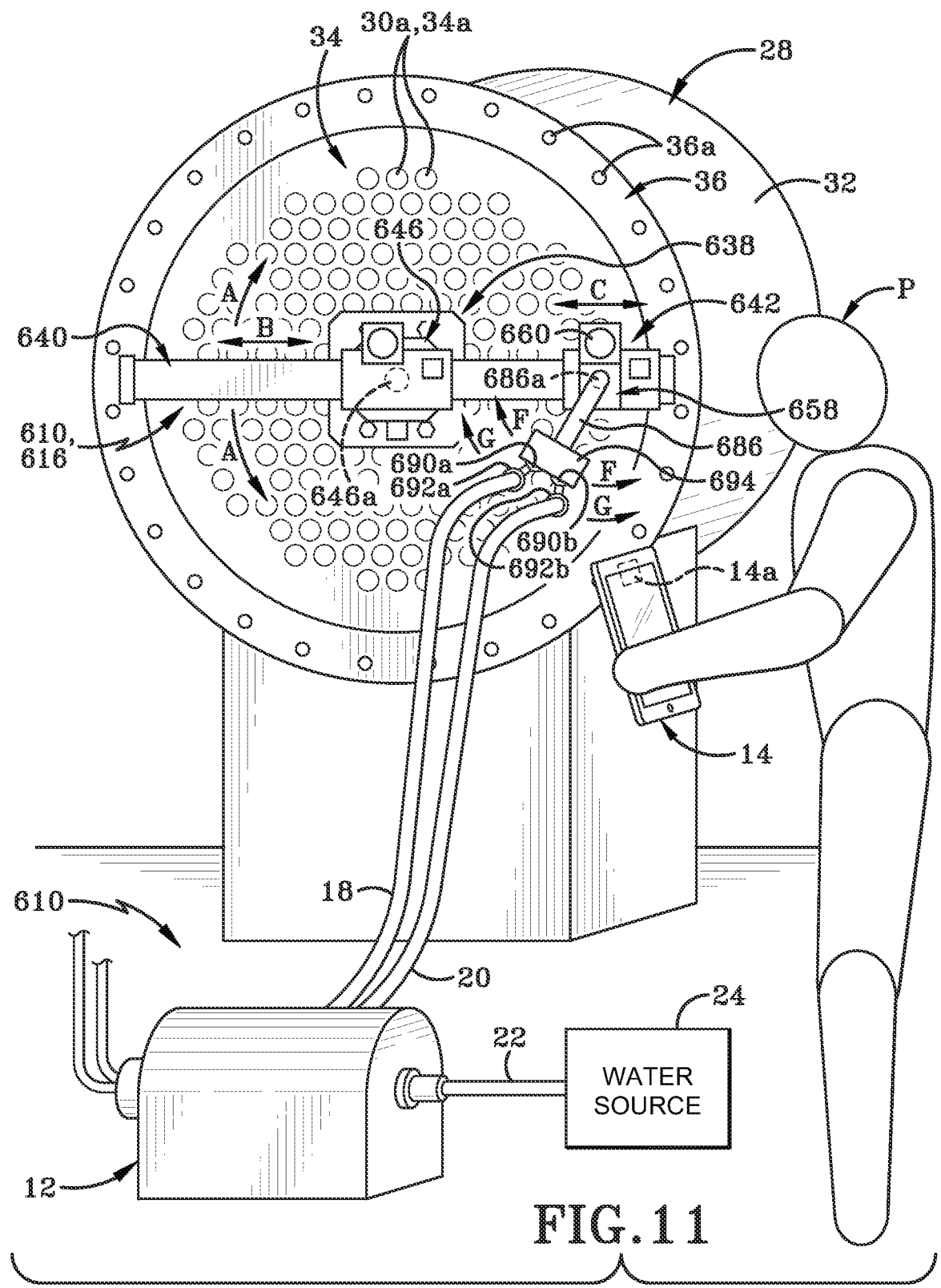
FIG. 11 is a diagrammatic front elevation view of a seventh embodiment of a rotary tool with a smart indexing controller in accordance with the present disclosure.

Referring now to FIG. 11, there is shown a seventh embodiment of a cleaning system 610 in accordance with the present disclosure. Cleaning system 610 comprises the water delivery system 12, communication device 14, and a seventh embodiment of a rotary tool in accordance with the present disclosure, generally indicated at 616. Rotary tool 616 comprises a mounting assembly 638, a supporting arm 640, and a carriage assembly 642.

Rotary tool 616 is substantially identical to rotary tool 516 and functions in substantially the same manner as rotary tool 516 except in the structure and functioning of the arm 686. A first end of arm 686 is rotatably engaged with lance-mounting assembly 658 on carriage assembly 642 in the same manner as arm 586 is engaged with lance-mounting assembly 558 on carriage assembly 542. Arm 686 is selectively rotatable about an axis 686a that extends through the first end of arm 686 and is oriented parallel to the drive shaft 646a of the rotation motor 646 provided on mounting assembly 638. In particular, the arm 686 is selectively rotatable in the directions indicated by the arrows "H" in FIG. 11. The free end of arm 686 remote from the first end thereof differs from the free end of arm 586. In particular, the free end of arm 686 includes an actuator housing 694 that houses two laterally spaced actuators (not shown), associated connectors 690a, 690b, and associated lance holders 692a, 692b that are substantially identical in structure and function to the actuators 66a, 66b, connector 68a, 68b and lance holders 70a, 70b shown in FIGS. 4A and 4B. The actuators in actuator housing 694 are operatively engaged with second linear motor 660 and are manipulated thereby in order to pivot the associated lance holders 692a, 692b relative to actuator housing 694 and thereby to arm 686. Several motions of components of rotary tool 616 are therefore able to be controlled by the operator "P" using the communication device 14 and the special programming therein. The entire supporting arm 640 is able to be rotated relative to mounting assembly 638 as indicated by arrow "A" in FIG. 11. Additionally, the entire supporting arm 640 is able to be moved linearly relative to the mounting assembly 638 in the directions indicated by the arrows "B"; the carriage assembly 642 is able to be moved linearly along the longitudinal axis of the supporting arm 640 in the directions indicated by the arrows "C"; the arm 686 on carriage assembly 642 is able to be rotated relative to the lance-mounting assembly 658 in the directions indicated by the arrows "F", and the lance-holders 692a, 692b are able to be pivoted relative to the actuator housing 694 and relative to each other. The pivotal motion of the lance-holders 692a, 692b relative to each other and to actuator housing 694 is indicated by the arrows "J" in FIG. 11.

Again, all of the various possible motions of the components of rotary system 616 are able to be utilized by the operator "P" controlling the communication device 14 in order to teach the software the pattern of openings 34a in the face plate 34 of the heat exchanger. The software is then able to accurately maneuver the nozzle on the lance held in the lance holders 692a, 692b to perform a cleaning operation.

Figure 12:
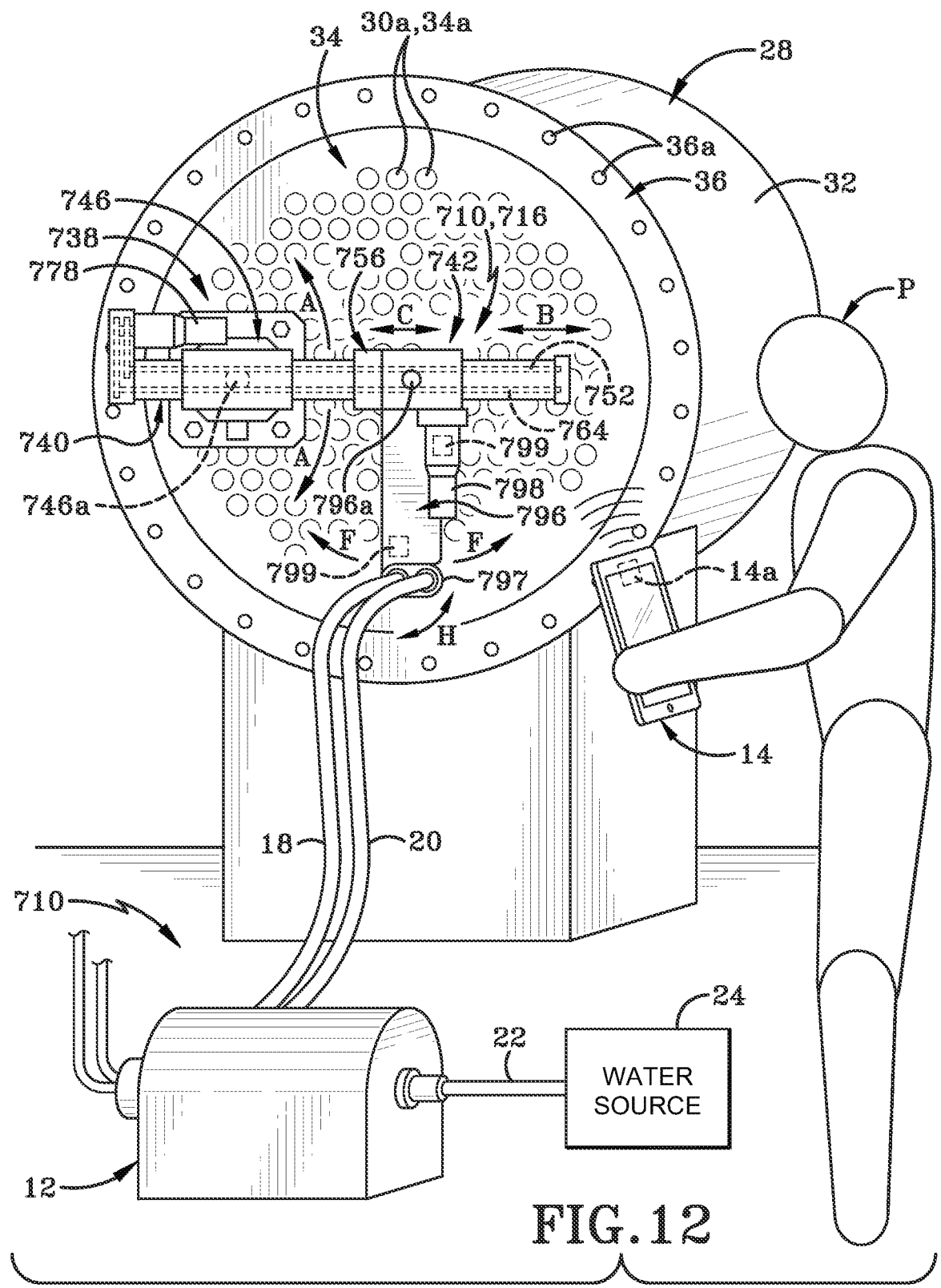
FIG. 12 is a diagrammatic front elevation view of an eighth embodiment of a rotary tool with a smart indexing controller in accordance with the present disclosure.

Referring now to FIG. 12, there is shown an eighth embodiment of a cleaning system 710 in accordance with the present disclosure. Cleaning system 710 comprises the water delivery system 12, communication device 14, and an eighth embodiment of a rotary tool in accordance with the present disclosure, generally indicated at 716. Rotary tool 716 comprises a mounting assembly 738, a supporting arm 740, and a carriage assembly 742.

Mounting assembly 738 is substantially identical in structure and function to the mounting assembly 238 shown in FIG. 7. Additionally, supporting arm 740 is substantially identical in structure and function to supporting arm 240 shown in FIG. 7. Rotary tool 716 includes first and second translation mechanisms 752 and 764 that are identical in structure and function to first and second translation mechanisms 252, 264 shown in FIG. 7. Mounting assembly 738, supporting arm 740, first and second translation mechanisms 752, 764 will therefore not be discussed further herein.

Rotary tool 716 differs from rotary tool 216 shown in FIG. 7 in that the carriage assembly 742 differs from carriage assembly 242 in a number of ways. Carriage assembly 742 comprises a carriage housing 756 that is substantially identical in structure and function to carriage housing 56 shown in FIG. 1. Carriage assembly 742 further includes a leg 796, a lance holder 797, and a motor 798 that causes rotation of leg 796. Leg 796 is pivotally engaged with carriage housing 756 via a pivot rod 796a and is selectively rotatable about pivot rod 796a as indicated by the arrows "K" in FIG. 12. Pivot rod 796a is substantially parallel to the axis that extends along drive shaft 746a of rotation motor 746. A first end of lance holder 797 is pivotally engaged with leg 796 in such a way that lance holder 797 is able to pivot away from and towards leg 797. In particular, lance holder 797 remains in a same plane as the leg 797 when the lance holder 797 pivots. This pivotal motion is indicated by the arrows ""M" in FIG. 12. Motor 798 is operable to rotate leg 796 about pivot rod 796a and/or to pivot lance holder 797 relative to leg 796.

Lance holder 797 is configured to receive a pair of lances therein, each lance being engaged with one of the first hose 18 and second hose 20 of water delivery system 12. One or more transceivers 799 are provided on carriage assembly 742 to enable communication between communication device 14, second linear motor 798 and an actuator (not shown) that operatively engages leg lance holder 797 and leg 796.

Several motions of components of rotary tool 716 are therefore able to be controlled by the operator "P" using the communication device 14 and the special programming therein. The entire supporting arm 740 is able to be rotated relative to mounting assembly 738 as indicated by arrow "A" in FIG. 12. Additionally, the entire supporting arm 740 is able to be moved linearly relative to the mounting assembly 738 in the directions indicated by the arrows "B"; the carriage assembly 742 is able to be moved linearly along the longitudinal axis of the supporting arm 740 in the directions indicated by the arrows "C"; and the lance holder 797 is able to pivot relative to leg 796 and thereby relative to carriage assembly 742 as indicated by the arrows "J" in FIG. 12. Again, all of the various possible motions of the components of rotary system 716 are able to be utilized by the operator "P" controlling the communication device 14 in order to teach the software the pattern of openings 34a in the face plate 34 of the heat exchanger. The software is then able to accurately maneuver the nozzle on the lances held in the lance holder 797 to perform a cleaning operation.

In rotary tool 716, first linear motor 778 may move lance-supporting arm 740 linearly relative to mounting assembly 738 utilizing first translation mechanism 752. Alternatively, first linear motor 778 may selectively move supporting arm 740 linearly relative to mounting assembly 738 using first translation mechanism 752 and selectively move carriage assembly 242 linearly relative to supporting arm 740 utilizing second translation mechanism 764.

Additionally, in rotary tool 716, second linear motor 798 may linearly move carriage assembly 742 relative to supporting arm 740 using second translation mechanism and may also selectively actuate the pivotal motion of lance holder 797. Alternatively, second linear motor 798 may only actuate the pivotal motion of lance holder 797. Still further, the pivotal motion of lance holder 797 may be actuated only by receiving a signal directly from communications device 14.

Figure 13:
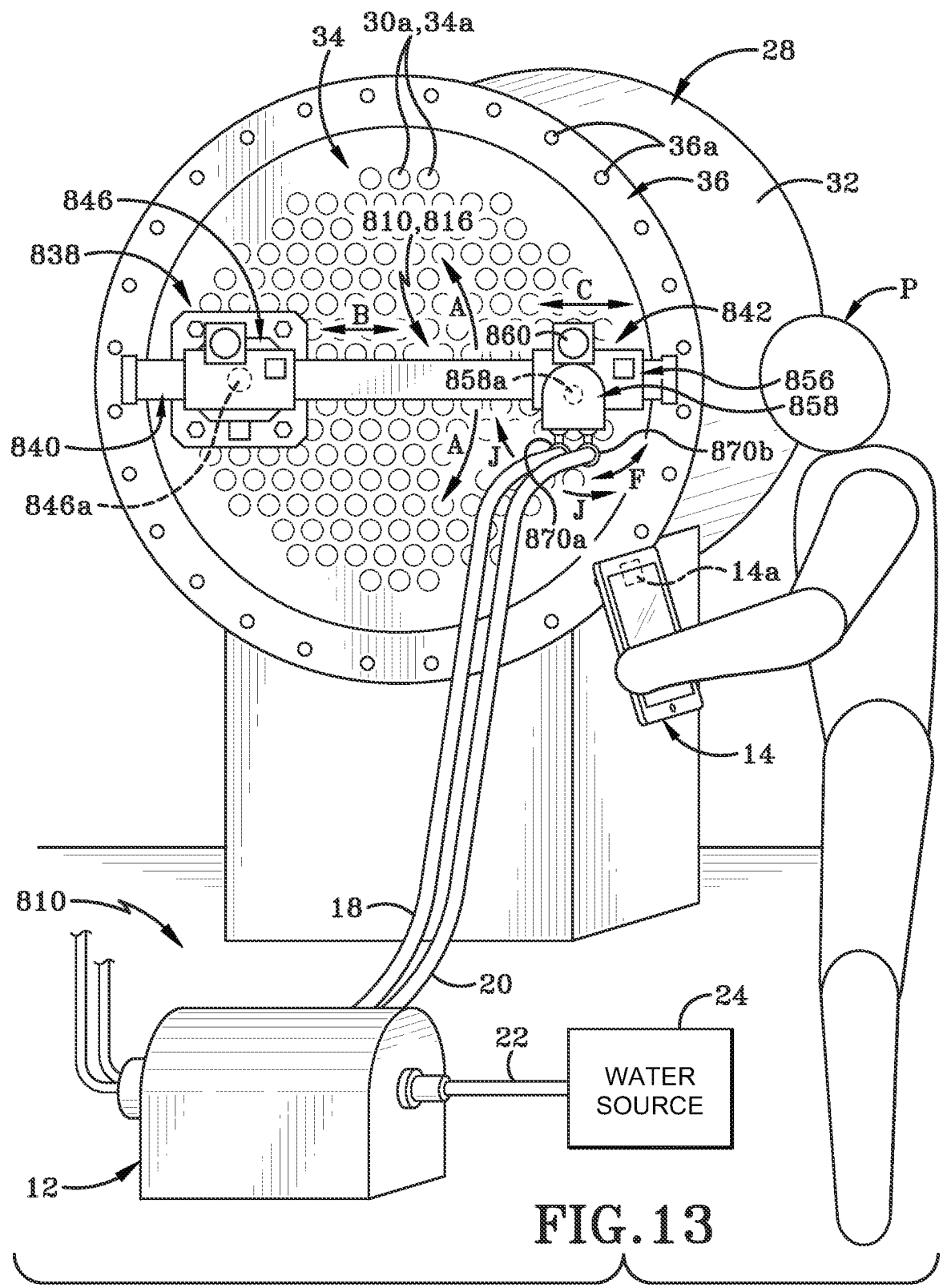
FIG. 13 is a diagrammatic front elevation view of a ninth embodiment of a rotary tool with a smart indexing controller in accordance with the present disclosure.

Referring now to FIG. 13, there is shown a ninth embodiment of a cleaning system 810 in accordance with the present disclosure. Cleaning system 810 comprises the water delivery system 12, communication device 14, and a ninth embodiment of a rotary tool in accordance with the present disclosure, generally indicated at 816. Rotary tool 816 comprises a mounting assembly 838, a supporting arm 840, and a carriage assembly 842.

Mounting assembly 838 is substantially identical in structure and function to the mounting assembly 38 shown in FIG. 1A. Additionally, supporting arm 840 is substantially identical in structure and function to supporting arm 40 shown in FIG. 1A. Rotary tool 816 includes a first and a second translation mechanism 852 and 864 that are substantially identical in structure and function to first and second translation mechanisms 252, 264. In other embodiments, first translation mechanism 852 and second translation mechanism 864 may be a rack and pinion system or one of the mechanism 852, 864 may be a rack and pinion system and the other may be a rotating threaded rod/drive assembly system. Any other suitable type of translation mechanism may be utilized instead of the rack and pinion or rotating threaded rod/drive assembly systems. Mounting assembly 838, supporting arm 840, first and second translation mechanisms 852, 864 will therefore not be discussed further herein.

Rotary tool 816 differs from rotary tool 16 shown in FIG. 1A in that the carriage assembly 842 differs from carriage assembly 42 in one or more ways. Carriage assembly 842 includes a carriage housing 856 that is substantially identical in structure and function to carriage housing 56. Carriage assembly 842 also includes a second linear motor 860 that is substantially identical in structure and function to second linear motor 60. Carriage assembly 842 differs from carriage assembly 42 in that the lance-mounting assembly 858 is mounted, via a shaft 858a, to carriage housing 856. Shaft 858a is oriented substantially parallel to the axis that extends along drive shaft 846a of rotation motor 846. A wall of lance-mounting assembly 858 proximate second linear motor 860 is arcuate in shape. Lance-mounting assembly 858 may be pivoted by second linear motor or some other actuating mechanism to rotate about shaft 858a. This pivotal motion is indicated by the arrows "N" in FIG. 13. All other components of lance-mounting assembly 58 are found on lance-mounting assembly 858. In particular, there are actuators, connectors, and lance holders that are substantially identical to actuators 66a, 66b, connectors 68a, 68b, and lance holders 70a, 70b shown in FIGS. 4A and 4B. As a result of this configuration, lance-mounting assembly 858 is pivotable relative to the rest of carriage assembly 838 and lance holders 870a, 870b are pivotable relative to lance-mounting assembly 858, as indicated by the arrows "P" in FIG. 13.

Several motions of components of rotary tool 816 are therefore able to be controlled by the operator "P" using the communication device 14 and the special programming therein. The entire supporting arm 840 is able to be rotated relative to mounting assembly 838 as indicated by arrow "A" in FIG. 13. Additionally, the entire supporting arm 840 is able to be moved linearly relative to the mounting assembly 838 in the directions indicated by the arrows "B"; the carriage assembly 842 is able to be moved linearly along the longitudinal axis of the supporting arm 840 in the directions indicated by the arrows "C". Additionally, the lance-mounting assembly 858 is able to pivot relative carriage housing 858 and thereby relative to carriage assembly 842 as indicated by the arrows "K" in FIG. 13. Still further, the lance holders 870a and 870b are able to pivot relative to lance-mounting assembly 858 as indicated by the arrows "M" in FIG. 13. All of the various possible motions of the components of rotary system 816 are able to be utilized by the operator "P" controlling the communication device 14 in order to teach the software the pattern of openings 34a in the face plate 34 of the heat exchanger. The software is then able to accurately maneuver the nozzle on the lances held in the lance holders 870a, 870b to perform a cleaning operation.

While cleaning system 10 is illustrated and described herein as being useful for cleaning heat exchanger tubes, it will be understood by those skilled in the art that cleaning system 10 may be used to clean a wide variety of other pieces of equipment. Furthermore, it should be understood that while the system 10 is referred to herein as a "cleaning system", the system 10 may be used for any of a variety of purposes other than "cleaning".

A method of cleaning a heat exchanger 28 utilizing a high-pressure water jet includes providing a communication device 14 provided with programming to control a cleaning operation of the heat exchanger 28 using a fluid jet cleaning device 16; engaging the cleaning device 16 on the heat exchanger 28 using a mounting assembly such as mounting assembly 38; connecting a lance 74a, 74b on the cleaning device 16 to a remote water source 24; controlling movement of the lance 74,a, 74b relative to openings 34a defined in a face plate 34 of the heat exchanger 28 using the programming in the communication device 14; moving the lance through one or more of a first degree of freedom "A" and a second degree of freedom "B", or "C" or "D", or "E", or "F", or "G", or "H", or "J" when moving from one opening 34a in the face plate 34 to another opening in the face plate 34. The moving of the lance 74a, 74b through the first degree of freedom "A" comprises rotating the lance 74a, 74b about an axis 46a on the mounting assembly 38, where the axis 46a is oriented at right angles to the face plate 34. The moving of the lance 74a, 74b through the first degree of freedom "A" includes operatively engaging the lance 74a, 74b on a supporting arm 40 (via carriage assembly 420 and rotating the entire supporting arm 40 about the axis 46a on the mounting assembly 38.

The moving of the lance 74a, 74b through the second degree of freedom "B" comprises linearly moving the lance 74a, 74b along a longitudinal axis "X1' that is oriented parallel to an outer surface of the face plate 34. The moving of the lance 74a, 74b through the second degree of freedom "B" includes operatively mounting the lance 74a, 74b on a supporting arm 40, engaging the supporting arm 40 with the mounting assembly 38; and moving the supporting arm 40 linearly with respect to the mounting assembly 38. The moving of the supporting arm 40 linearly with respect to the mounting assembly 38 may include moving the entire supporting arm 40 linearly with respect to the mounting assembly 38.

The moving of the lance through another degree of freedom "C" includes operatively mounting the lance 74a, 74b on a carriage assembly 42 engaged on a supporting arm 40, operatively engaging the supporting arm 40 with the mounting assembly 38; and moving the carriage assembly 42 linearly along the supporting arm 40.

A method of cleaning a plurality of tubes 30 of a heat exchanger 28 includes engaging a fluid jet machine 16 on the heat exchanger 28; operatively linking the fluid jet machine 16 to a communication device 14; installing programming in the communication device 14 that controls the fluid jet machine 16 and a cleaning operation using the fluid jet machine 16; providing a pattern of openings 34a in a face plate 34 of the heat exchanger 28 to the communication device 14; and performing the cleaning operation following the pattern.

In one embodiment, the pattern of openings 34a is provided to the communication device 14 by learning the pattern. This is done by initiating the special programming of the communication device 14, such as "THE LUNCHBOX®". In one embodiment, the learning of the pattern of the plurality of tubes 30 includes determining a pattern of openings 34a to the plurality of tubes 30 in the face plate 34 of the heat exchanger 28. In one embodiment, the determining of the pattern of openings 34a is accomplished using a camera (not shown but provided at any suitable location on the mounting assembly 38, supporting arm 40, and carriage assembly 42, the communication device 14, or an independent camera operated by the operator, or on the heat exchanger itself) to locate the openings 34a in the face plate 34. In one embodiment the determining of the pattern of openings 34a is accomplished using a laser (not shown but provided at any suitable location on the mounting assembly 38, supporting arm 40, and carriage assembly 42, or operated separately by the operator, or on the heat exchanger itself) to locate the openings 34a in the face plate 34. In one embodiment, the determining of the pattern of openings 34 is accomplished by manually aligning a nozzle 76 on the fluid jet machine 16 with a sample number of openings 34a in the face plate 34 (as has been described in the priority patent application U.S. Ser. No. 16/265,387). In one embodiment, the manually aligning of the nozzle 76 includes controlling movement of the nozzle 76 with the communication device 14. In one embodiment, the controlling of the movement of the nozzle 76 with the communication device 14 is accomplished by manipulating icons on a user interface of the communication device 14. In one embodiment, the determining of the pattern of openings 34a is accomplished by uploading the pattern to the communication device 14. In one embodiment, the method further includes storing the learned or uploaded pattern of openings 34a in a memory of the communication device 14. The pattern of openings in multiple different heat exchangers may be provided to the communication device 14 in any of the above-described ways (or in any other way not described herein but known to one of ordinary skill in the art) and then the operator will simply select the appropriate pattern of openings 34a from a menu on the communication device user interface.

In one embodiment, the programming in the communication device 14 controls a position of a lance/lance holder/nozzle 74a, 74b, 72a, 72b, 70a, 70b, 76 on the rotary tool 16 by controlling rotation "A" of a supporting arm 40 of the rotary tool 16 relative to a mounting assembly 38 of the rotary tool. In one embodiment, the programming in the communications device 14 controls a position of a lance/lance holder/nozzle 74a, 74b, 72a, 72b, 70a, 70b, 76 on the rotary tool 16 by controlling linear motion "B" of a supporting arm 40 of the rotary tool 16 relative to a mounting assembly 38 of the rotary tool. In one embodiment, the programming in the communications device 14 controls a position of a lance/lance holder/nozzle 74a, 74b, 72a, 72b, 70a, 70b, 76 on the rotary tool 16 by controlling linear motion "C" of a carriage assembly 42 along a longitudinal axis "X1" of a supporting arm 40 of the rotary tool 161. In one embodiment, the programming in the communications device 14 controls a position of a lance/nozzle 74a, 74b, 76 on the rotary tool 16 by controlling rotational motion "D", "E", "F", "G", "H", "J" of a lance holder 70a, 70b, 72a, 72b relative to a carriage assembly 42 mounted on a supporting arm 40 of the rotary tool 16. It will be understood that in the controlling of the movement of the lance/lance holder/nozzle 74a, 74b, 72a, 72b, 70a, 70b, 76, the programming in communication device follows the learned or provided or stored pattern that corresponds to the arrangement of openings 34a in the face plate 34.

It will be understood that instead of engaging the mounting assembly on the face plate, or on the flange or rim of the face plate, or on any other part of the heat exchanger, in other embodiments, the mounting assembly may be a stand-alone unit or may be provided on another piece of equipment that is positioned proximate the heat exchanger and holds the cleaning device in a suitable position to perform a cleaning operation.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the disclosure. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A system comprising:
    a fluid jet machine positionable proximate equipment to be cleaned, said fluid jet machine including a rotatable arm provided with a lance holder, wherein, during performance of a cleaning operation, the fluid jet machine operatively connects to a pump which pumps fluid from a remote fluid source under high pressure through a lance retained by the lance holder, through openings defined in a face plate of the equipment, and into associated tubes extending away from the face plate; and
    a controller operable to control the fluid jet machine, rotation of the rotatable arm, and the cleaning operation, wherein the controller is located remote from the fluid jet machine and is operated by an operator in real time.

2. The system according to claim 1, further comprising programming installed in the controller and operable to control the fluid jet machine, rotation of the rotatable arm, and the cleaning operation; wherein the programming is configured to follow a pattern of the openings defined in the face plate and utilizes the pattern to move the lance progressively from one opening to another during the performance of the cleaning operation.

3. The system according to claim 2, wherein the pattern is learned by the programming of the controller and the controller moves the lance by following the learned pattern.

4. The system according to claim 2, wherein the rotatable arm is linearly movable relative the face plate of the equipment to be cleaned, and the programming in the controller is operable to control the linear movement of the rotatable arm.

5. The system according to claim 2, wherein the lance holder is linearly movable along the rotatable arm, and the programming in the controller is operable to control the linear movement of the lance holder.

6. The system according to claim 2, wherein the lance holder is rotatable relative to the rotatable arm, and the programming in the controller is operable to control the rotation of the lance holder.

7. A method of cleaning equipment having a plurality of tubes; said method comprising:
    providing a fluid jet cleaning device;
    linking a controller to the fluid jet cleaning device, wherein the controller is configured to control a cleaning operation of the equipment using the fluid jet cleaning device;
    engaging a mounting assembly of the fluid jet cleaning device with a region of the equipment;
    defining a pattern of openings in a face plate of the equipment, wherein each opening of a plurality of openings defined in the face plate provides access to a bore of an associated tube of the plurality of tubes;
    connecting a lance of the fluid jet cleaning device to a remote fluid source;
    controlling, with the controller, movement of the lance relative to the plurality of openings defined in the face plate of the equipment and in accordance with the pattern of openings,
    wherein controlling the movement of the lance with the controller includes controlling linear motion of the lance towards and away from the mounting assembly and controlling rotational motion of the lance about an axis of the mounting assembly, where the axis is oriented at right angles to the face plate;
    aligning, with the controller, a nozzle on the lance with a selected opening in the face plate;
    delivering, under control of the controller, a jet of cleaning fluid under pressure through the selected opening and into the associated tube, thereby cleaning the associated tube;
    withdrawing, under control of the controller, the lance from the selected opening;

moving, under control of the controller, the lance to a next selected opening in the face plate by following the pattern of openings in the face plate; and sequentially delivering, under control of the controller, the cleaning fluid under pressure through the lance and into each opening of the plurality of openings defined in the face plate until substantially all tubes of the plurality of tubes are cleaned.

8. The method according to claim 7, further comprising providing the controller with programming configured to control the cleaning operation of the equipment using the fluid jet cleaning device and controlling the cleaning operation with the programming.

9. The method according to claim 8, further comprising providing the pattern of openings defined in the face plate of the equipment to the programming of the controller and following the pattern of openings with the controller during performance of the cleaning operation.

10. The method according to claim 9, further comprising controlling, with the programming of the controller, movement of the lance relative to the plurality of openings defined in the face plate of the equipment and in accordance with the pattern of openings.

11. The method according to claim 9, wherein providing the pattern of openings to the programming of the controller includes learning, with the programming, the pattern of openings during a setup procedure performed prior to beginning the cleaning operation, and storing the learned pattern of openings in a database of the controller.

12. A system for cleaning equipment which includes a plurality of tubes extending from a face plate, wherein the face plate defines a plurality of openings therein and each tube of the plurality of tubes is aligned with a dedicated opening of the plurality of openings, and each dedicated opening places the associated tube in fluid communication with an environment surrounding the equipment, wherein said system comprises:

a mounting assembly adapted to be selectively engaged with the equipment;

a lance operatively engaged with the mounting assembly and adapted to be connected to a remote fluid source;

wherein the lance has at least a first degree of freedom and a second degree of freedom relative to the mounting assembly;

wherein the first degree of freedom is rotational movement of the lance about an axis oriented at right angles to a mounting plate of the mounting assembly, wherein the axis is adapted to be oriented parallel to the plurality of tubes;

wherein the second degree of freedom is linear movement of the lance in one of a first direction towards the mounting assembly and a second direction away from the mounting assembly, and the linear motion is adapted to be parallel to the face plate; and a controller operable to control the rotational movement and the linear movement of the lance relative to the mounting assembly.

13. The system according to claim 12, wherein the controller includes programming configured to control the rotational movement and the linear movement of the lance, and to control a cleaning operation with the system.

14. The system according to claim 13, further comprising a pattern provided to the programming of the controller, wherein the pattern is adapted to correspond to an arrangement of the plurality of openings defined in the face plate of the equipment, and wherein the programming follows the pattern when the controller controls the rotational movement and the linear movement of the lance.

15. The system according to claim 14, wherein the controller includes a memory, wherein the pattern is a learned pattern which is learned by the programming during a setup procedure; and wherein the programming stores the learned patterned in the memory of the controller.

16. The system according to claim 14, wherein the pattern is determined using one or more of a sensor, a camera, a laser, and a manual operation of moving the lance relative to the mounting assembly.

17. The system according to claim 12, further comprising a supporting arm operatively engaged with the mounting assembly; and wherein the lance is operatively engaged with the supporting arm.

18. The system according to claim 17, wherein the entire supporting arm is rotated relative to the mounting assembly when the lance is moved in accordance with the first degree of freedom.

19. The system according to claim 17, wherein the entire supporting arm is moved linearly relative to the mounting assembly when the lance is moved in accordance with the second degree of freedom.

20. The system according to claim 19, further comprising a carriage assembly operatively engaged with the supporting arm, wherein the lance is operatively engaged with the carriage assembly, and wherein the carriage assembly is moved linearly along the supporting arm when the lance is moved in accordance with the second degree of freedom.

* * * * *